US012204509B1

(12) United States Patent
Lashgari et al.

(10) Patent No.: US 12,204,509 B1
(45) Date of Patent: Jan. 21, 2025

(54) AUTO-SCALING FOR SEMANTIC DEDUPLICATION OF EVENT LOGS

(71) Applicant: Oracle International Corporation, Redwood Shores, CA (US)

(72) Inventors: Kourosh Lashgari, Sammamish, WA (US); Joydeep Halder, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/438,036

(22) Filed: Feb. 9, 2024

Related U.S. Application Data

(63) Continuation-in-part of application No. 18/449,402, filed on Aug. 14, 2023, now Pat. No. 12,093,230.

(51) Int. Cl.
*G06F 16/00* (2019.01)
*G06F 16/215* (2019.01)
*G06F 16/23* (2019.01)
*G06F 16/28* (2019.01)

(52) U.S. Cl.
CPC ........ *G06F 16/215* (2019.01); *G06F 16/2358* (2019.01); *G06F 16/285* (2019.01)

(58) Field of Classification Search
CPC ... G06F 16/215; G06F 16/2358; G06F 16/285
See application file for complete search history.

(56) References Cited

U.S. PATENT DOCUMENTS

| | | | | |
|---|---|---|---|---|
| 7,509,539 B1 * | 3/2009 | Denefleh | ............... | G06F 11/079 714/48 |
| 8,782,010 B2 * | 7/2014 | Huang | ................ | G06F 16/1748 711/161 |
| 9,122,694 B1 * | 9/2015 | Dukes | .................... | G06F 3/0641 |
| 10,162,832 B1 * | 12/2018 | Mankude | ............... | G06F 16/116 |
| 10,275,496 B2 * | 4/2019 | Brew | ....................... | G06F 11/30 |
| 11,221,778 B1 * | 1/2022 | Miller | ................. | H03M 7/3068 |
| 11,436,344 B1 * | 9/2022 | Juch | ..................... | G06F 16/2365 |
| 11,768,837 B1 * | 9/2023 | Newman | ........... | G06F 16/24575 707/722 |
| 11,836,265 B2 * | 12/2023 | Poirel | ................. | G06F 21/6218 |
| 2016/0044100 A1 * | 2/2016 | Tripathy | ............... | G06F 3/0613 709/219 |

(Continued)

OTHER PUBLICATIONS

"Disjoint-set data structure", Wikipedia, Retrieved from https://en.wikipedia.org/wiki/Disjoint-set_data_structure, Retrieved on Jun. 29, 2023, pp. 13.

*Primary Examiner* — Noosha Arjomandi
(74) *Attorney, Agent, or Firm* — Invoke

(57) ABSTRACT

Techniques for autoscaling a deduplication process include receiving a first plurality of event records in an event stream during a first period of time and determining real-time characteristics of the event stream based on the event records received during the first period of time. Based on the real-time characteristics of the event stream, a level of similarity for a deduplication process is selected to apply for future event records received in the event stream. The deduplication process may also be enabled or disabled based on the real-time characteristics. A second plurality of event records is received in the event stream during a second period of time. If deduplication is enabled, the second plurality of event records are deduplicated based on the level of similarity.

20 Claims, 16 Drawing Sheets

(56) References Cited

U.S. PATENT DOCUMENTS

| | | | | |
|---|---|---|---|---|
| 2018/0268253 A1* | 9/2018 | Hoffman | ............... | G06V 10/761 |
| 2020/0380417 A1* | 12/2020 | Briancon | ......... | G06Q 10/06393 |
| 2021/0374162 A1* | 12/2021 | Kirdey | .................... | G06F 40/30 |
| 2022/0237618 A1* | 7/2022 | Lee | ........................ | G06Q 40/02 |
| 2022/0318070 A1* | 10/2022 | Perneti | .................. | G06F 16/215 |
| 2022/0335245 A1* | 10/2022 | Missale | ................... | G06F 18/22 |
| 2023/0196453 A1* | 6/2023 | Shiu | ...................... | G06F 16/285 |
| | | | | 705/38 |
| 2023/0206329 A1* | 6/2023 | Cella | ................... | H04L 43/0852 |
| 2023/0244691 A1* | 8/2023 | Pendharkar | ............. | G06F 16/27 |
| | | | | 707/620 |
| 2023/0350862 A1* | 11/2023 | Munuri | ................. | G06F 16/258 |
| 2024/0045598 A1* | 2/2024 | Derryberry | ......... | G06F 11/2094 |

\* cited by examiner

AUTO-SCALING FOR SEMANTIC DEDUPLICATION OF EVENT LOGS

INCORPORATION BY REFERENCE; DISCLAIMER

Each of the following applications are hereby incorporated by reference: application Ser. No. 18/449,402, filed Aug. 14, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to automatically enabling, disabling, and scaling a semantic deduplication process.

BACKGROUND

One of the common problems of event logging is the excessively large size of logs. As an example, security assurance and compliance audit logs may be excessively large, rendering the logging cost-prohibitive to store or transmit all logged events. Some existing solutions reduce log volumes in real-time without losing the essence of the information. These solutions typically relate to data cleaning or storage optimization categories.

Certain existing methodologies evaluate multiple records sourced from different places into one through merging and completing missing data. This work is generally done offline in a batch process to remove any spelling errors, grammatical mistakes, missing values, changes of location or similar kind of data issues, thereby performing data cleaning.

Another industry practice relates to storage optimization, where the records are stored completely, and there are schemes to identify the differences and keep/store the differences without the similarities. This process is also mostly done as a batch process and intended to reconstruct the full original data records similar to decompressing the data with zero data loss.

Conventional technology often implements lossless logs, retaining all data and/or compressing the data in a manner that allows for recovery of all data. Furthermore, existing systems log the same event multiple times with merely different permutations of the same event. The action taken is often the same for every permutation of the same type of a problem. These types of techniques can be wasteful because they frequently create redundancy in event logging and data processing.

Another problem affecting event logging is that the volume or number of logs generated in a given time frame may vary unpredictably from one time frame to another. Strategies for handling a high volume of logs may result in unnecessary data loss when the volume is reduced.

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
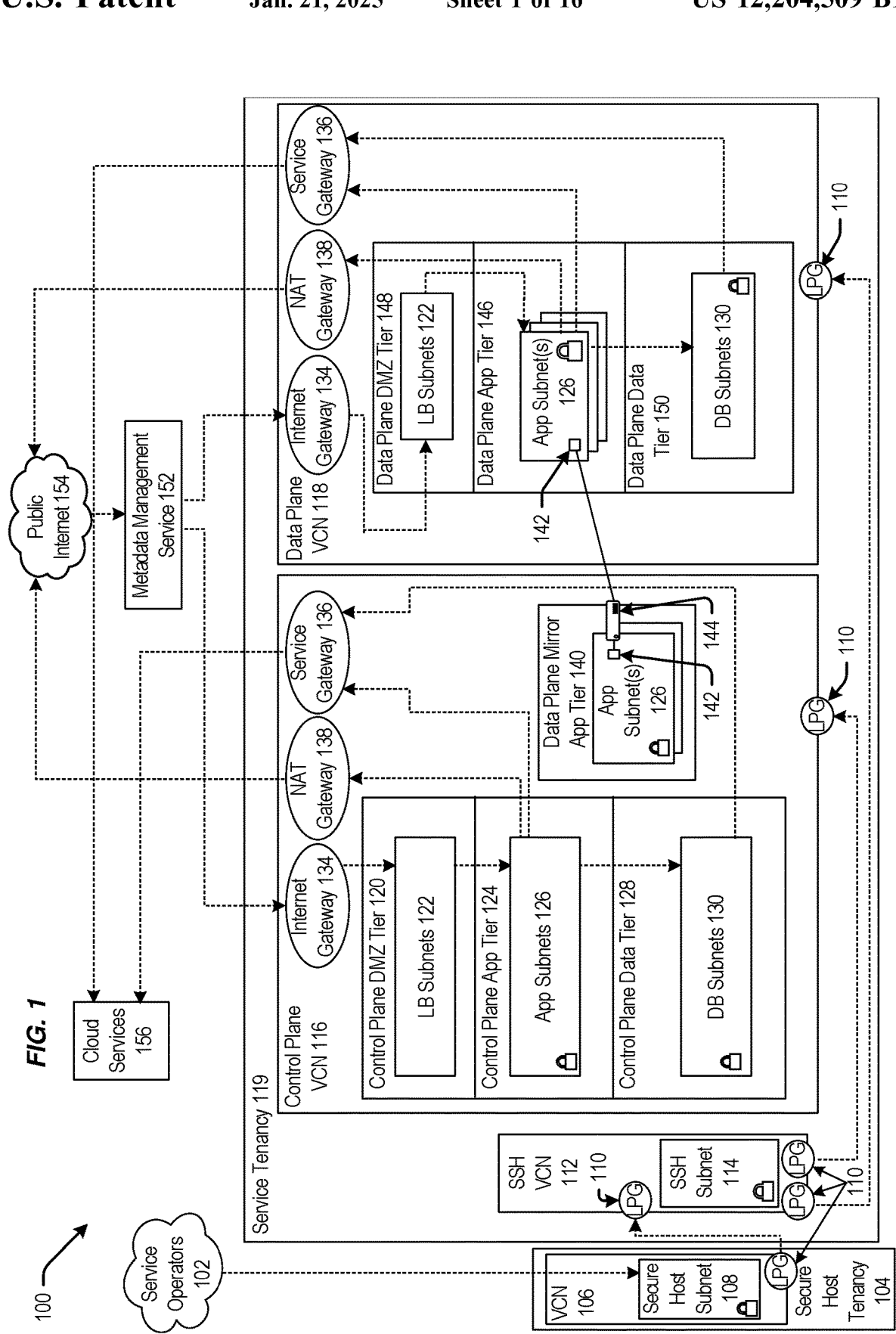
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the disclosure.

1. GENERAL OVERVIEW
2. CLOUD COMPUTING TECHNOLOGY
3. COMPUTER SYSTEM
4. SEMANTIC DEDUPLICATION ARCHITECTURE
5. SEMANTIC DEDUPLICATION OPERATIONS
6. AUTOSCALING DEDUPLICATION ARCHITECTURE
7. AUTOSCALING DEDUPLICATION OPERATIONS
8. MACHINE LEARNING

1. General Overview

A deduplication process is used to select a set of representative events to represent a set of events received via an event stream. The set of representative events may correspond to a subset of the set of received events.

One or more embodiments modify a deduplication process for deduplicating events received via an event stream, in real-time based on the changing characteristics of the event stream. The system may, for example, modify a level of similarity used for identification of duplicates during a deduplication process. The level of similarity may be selected in real time based on (a) a rate that events are being received via the event stream, (b) an amount of time needed for processing events, (c) a number of resources available for processing the events, and/or (d) an availability of resources available for processing the events.

The system may select the level of similarity based on a target number of events to be generated by the deduplication process. The system may train and apply a machine learning (ML) model to predict a number of representative events that will be generated by a deduplication process. The ML model may be applied to the volume of the events, characteristics of the events, and the level of similarity to predict the number of representative events.

In an example, the system receives a first set of event records in an event stream during a first period of time. When an event record in the first set does not meet a first level of similarity according to a first similarity criterion in relation to a set of previously received event records, the event record is added to the previously received event records and stored. The system determines a first set of real-time characteristics of the event stream. Based on the first set of real-time characteristics, the system selects a second level of similarity and modifies the first similarity criterion according to the second level of similarity. The system then receives a second set of event records during a second period of time. When an event record in the second set does not meet the second level of similarity according to the second similarity criterion in relation to a set of previously received event records, the event record is added to the previously received event records and stored.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on the code that will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram 100 illustrating an example pattern of an IaaS architecture, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, for example, portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119 that may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. Both the control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 that may not have a desired level of threat prevention.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119 that may be isolated from public Internet 154.

Figure 2:
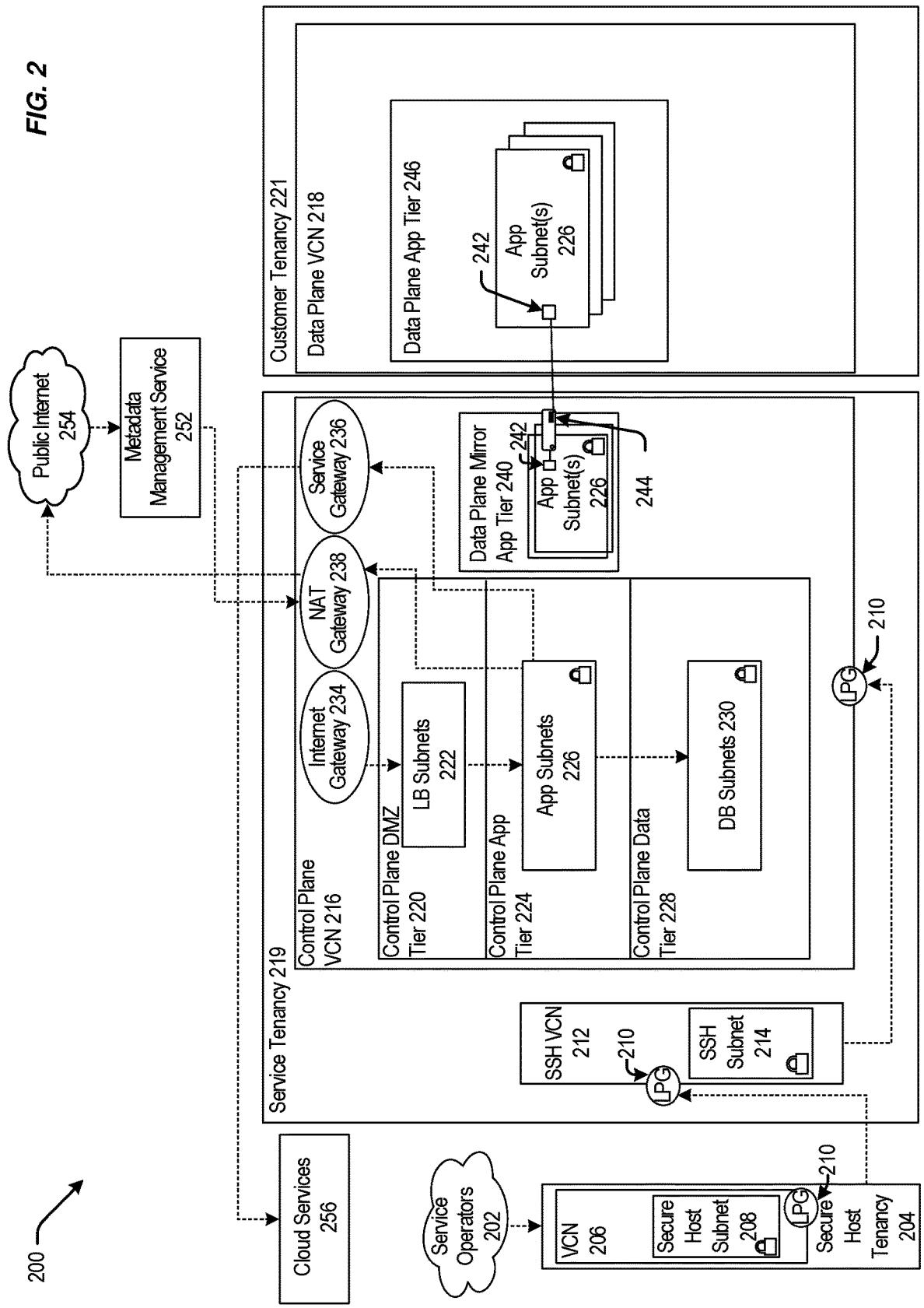

FIG. 2 is a block diagram 200 illustrating another example pattern of an IaaS architecture, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
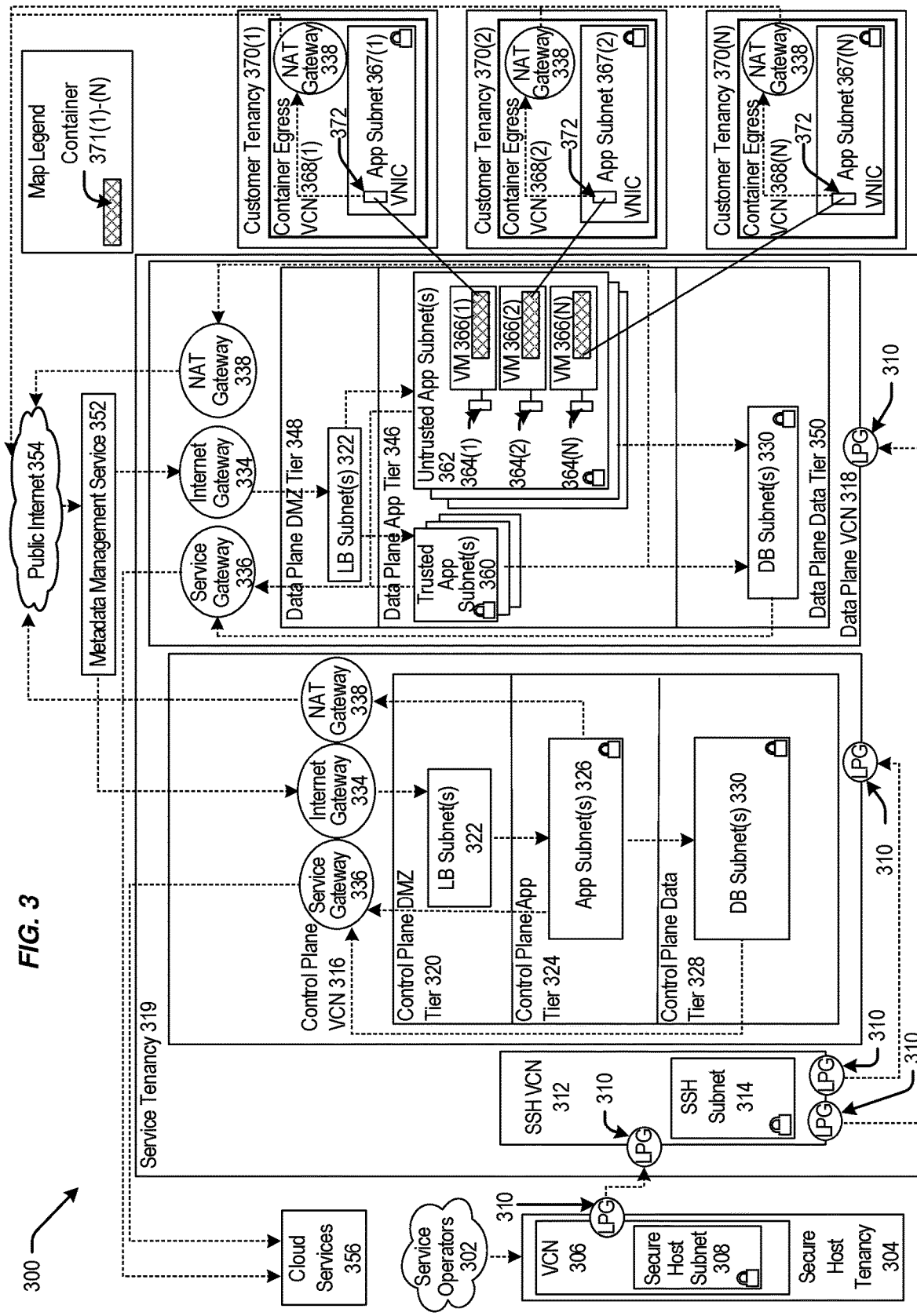

FIG. 3 is a block diagram 300 illustrating another example pattern of an IaaS architecture, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management system 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N)

running code, where the containers 371(1)-(N) may be contained in at least the VM 366(1)-(N) that are contained in the untrusted app subnet(s) 362). The dual isolation may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
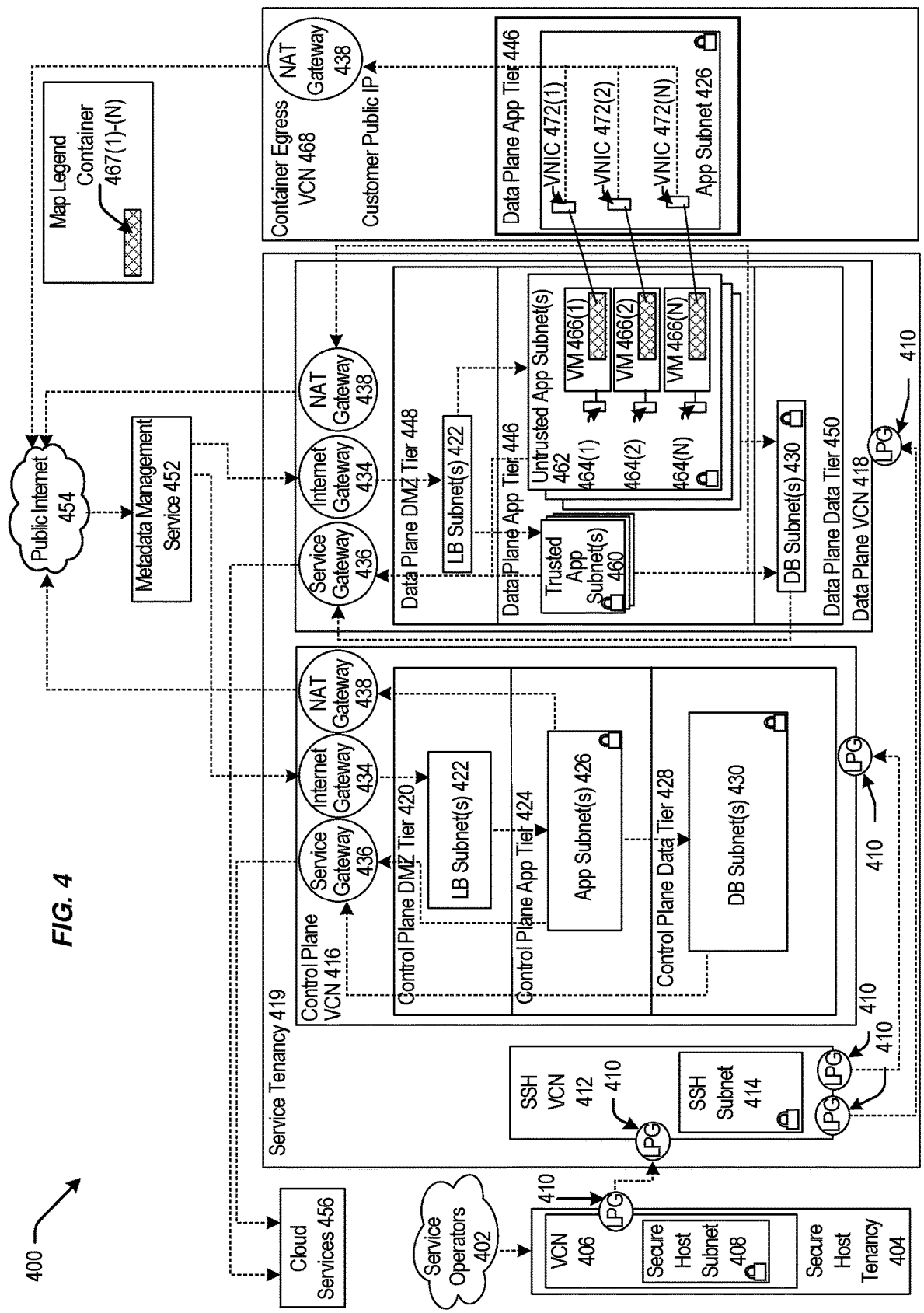

FIG. 4 is a block diagram 400 illustrating another example pattern of an IaaS architecture, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management system 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICS 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates the tenants that have authorization to access specific applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
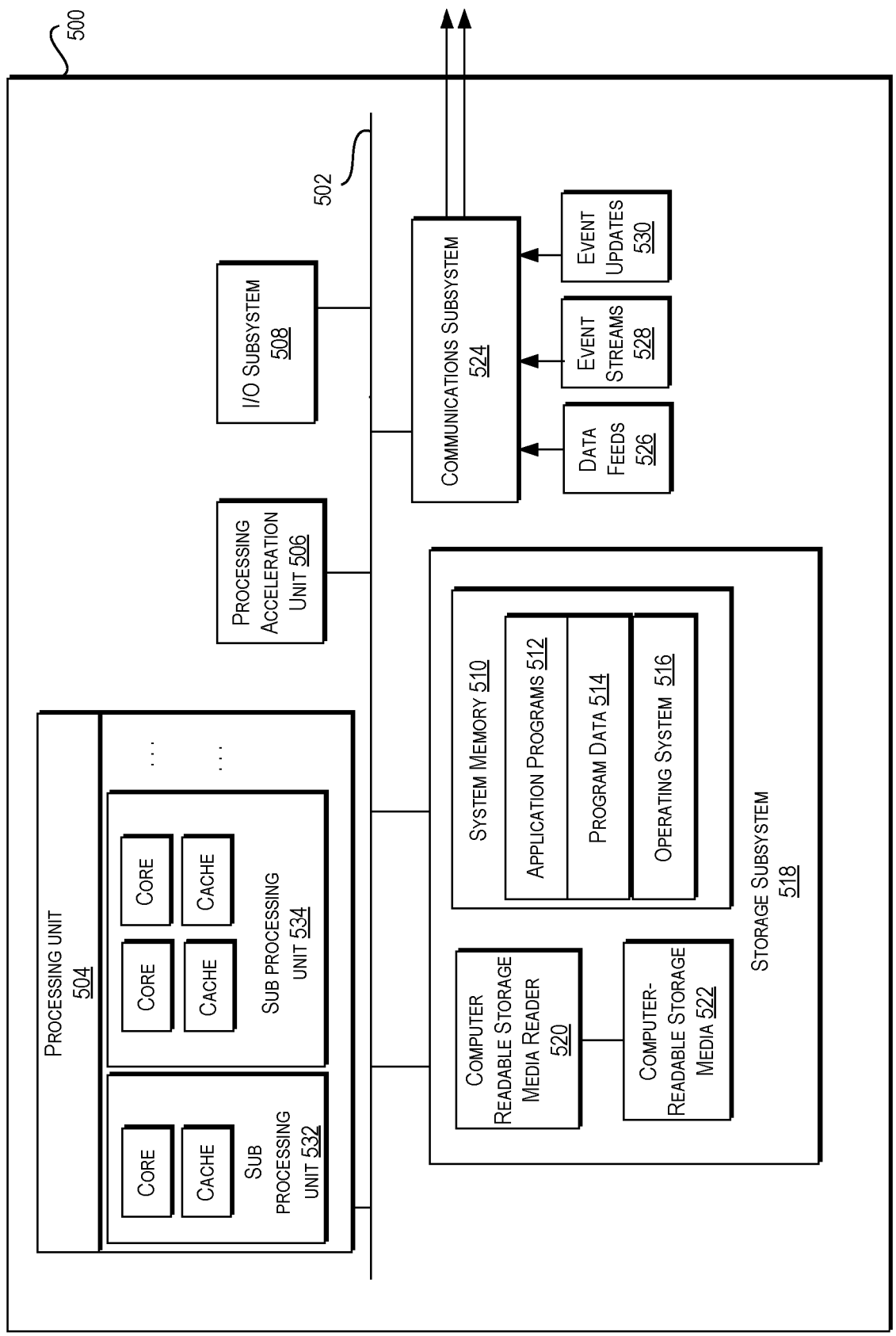
FIG. 5 is a hardware system in accordance with one or more embodiments.

FIG. 5 illustrates an example computer system 500, in which various embodiments may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus that can be implemented as a Mezzanine bus manufactured to the IEEE P1386.1 standard.

Processing unit 504 can be implemented as one or more integrated circuits (e.g., a conventional microprocessor or microcontroller) and controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory 510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams that may include event streams 528 of real-time events, and/or event updates 530 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Semantic Deduplication Architecture

Figure 6A:
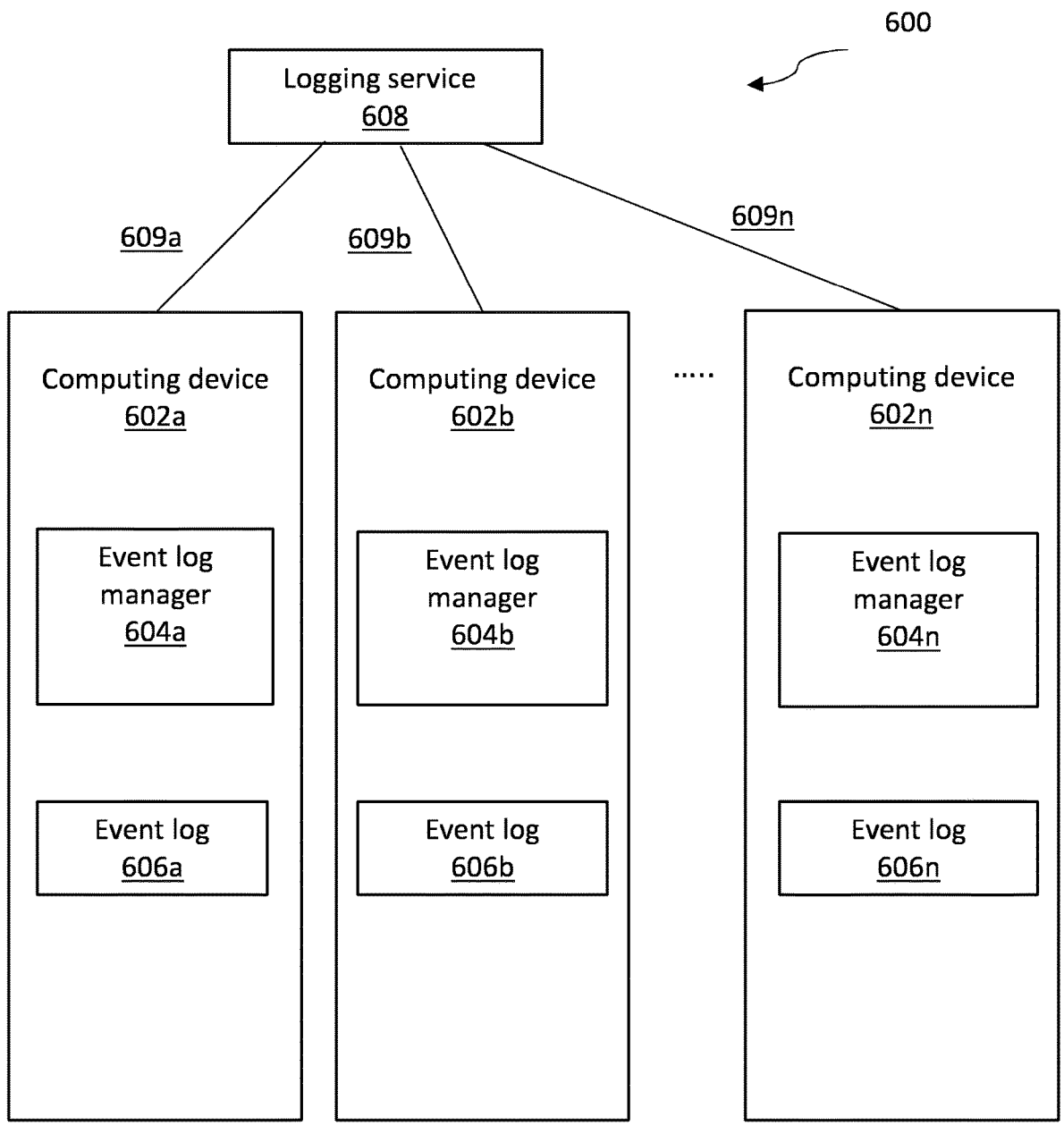
FIG. 6A is an example of a logging service architecture.

One embodiment of the present application, shown in FIG. 6A, is a semantic deduplication architecture 600 that includes logging service 608 and one or more computing devices 602 (602a to 602n). Each of the computing devices 602 may include an event log manager 604 and an event log 606.

The logging service 608 may be a software component or a dedicated service that captures and records events and messages generated by various systems, applications, or devices. In one embodiment, the logging service 608 is used for software development, IT operations, and cybersecurity to gather and store log data for analysis, troubleshooting, and monitoring purposes.

One of the functions of the logging service 608 may be to collect and store log entries that may be textual or numerical records containing information about specific events, actions, errors, or warnings. These log entries can include timestamps, log levels, error codes, user actions, system states, and other relevant details depending on the context and purpose of logging.

The logging service 608 may perform troubleshooting and debugging, where log data provides valuable insights into the behavior of software applications and systems. Developers and system administrators can analyze logs to identify and diagnose issues, trace the flow of execution, and fix problems more efficiently.

In one embodiment, the logging service 608 is used for performance monitoring. By monitoring and analyzing log data, organizations can gain visibility into the performance of their systems, identify bottlenecks or areas of improvement, and optimize resource allocation.

Further, the logging service 608 can be used for security assurance and compliance. Security Assurance may be a measure of confidence that the security features, practices, procedures, and architecture of the system 600 accurately mediate and enforce the security policy. The security assurance process assists human cognitive ability to follow a pattern of concern across a string of sliding time windows to aid in troubleshooting and investigations. Having to process a high number of records in the event logs 606 can present troubleshooting challenges and result in additional steps to filter out unwanted records manually during a troubleshooting process.

Certain embodiments of the present application identify one representative record and a count of occurrences of the underlying issue to reason about an event or condition during troubleshooting sessions and the security event. Accordingly, the central logging service 608 may determine a measure of confidence based on the representative log records and associated counts. In one embodiment, the central logging service 608 displays the representation log records and associated counts to a human being for security assurance analysis.

Event logs 606 can be used for detecting and investigating security incidents. By analyzing the event logs 606, security teams can identify potential threats, track malicious activities, and ensure compliance with regulatory requirements by maintaining an audit trail of system events.

In another embodiment, the logging service 608 is used for auditing and accountability. The logging service 608 assists in establishing accountability by recording user actions and system activities, for example, in environments where multiple users or processes interact with critical systems.

In yet another embodiment, the logging service 608 provides analytics and insights. For example, aggregated log data can be analyzed using various techniques, such as data mining or machine learning, to extract meaningful patterns, trends, and insights that can be useful for capacity planning, anomaly detection, and improving overall system performance. The logging service 608 may be accompanied by tools for log aggregation, search, and visualization, allowing users to efficiently manage and search through large volumes of log data.

The logging service 608 may be connected to any number of sources of event logs via links 609. As an example, the logging service 608 may be connected to computing devices (e.g., computing devices 602a-602n). The logging service 608 may control or manage components (e.g., event log managers 604a-604n) executing on the computing devices. The logging service 608 may execute pull operations to pull event logs. Additionally, or alternatively, the logging service 608 may receive event logs via push operations executed by components executing on the computing devices.

In some embodiments, the links 609 may be intra-network links when the computing devices 602a-602n are within a same network as the logging service 608. The links 609 may be inter-network links when the computing devices 602a-602n are in a different network than the logging service 608. In some implementations, the links 609 may be limited with regard to data transmission speed or overall data throughput.

Furthermore, the links 609 may be congested or overloaded with data transmissions between the computing devices 602a-602n and the logging service 609. Certain embodiments reduce the amount of data that has to be transmitted over the links 609. Specifically, embodiments transmit representative event records instead of transmitting every event record over the links 609 from the computing devices 602a-602n to the logging service 608.

Event logs 606 may be records of events, activities, and errors that occur within a computer system, and they may be stored in a structured or unstructured format for later review and analysis. In one embodiment, the event log manager 604 provides a user interface or command-line interface (CLI) that allows users, such as system administrators or IT professionals, to view, filter, search, clear logs 606, analyze events, and/or configure event logging.

Event logs 606 may include application logs, security logs, system logs, and custom logs generated by installed software. Users can apply filters and search criteria to quickly find specific events of interest. Filtering may be particularly useful when troubleshooting issues or investigating security incidents. In one embodiment, the event log manager 604 provides detailed information about each event, including timestamps, event IDs, severity levels, source, and description. Analyzing the relevant data helps in understanding system behavior and diagnosing problems.

The event logs 606 can grow in size over time, consuming disk space. The event log manager 604 allows users to clear logs, either manually or through automated scheduling, to free up space and keep the logs manageable. Users can configure the behavior of event logging, such as specifying the types of events to log, setting log size limits, and enabling or disabling specific event categories. In some cases, especially in large-scale environments, event log forwarding allows centralizing event logs 606 from multiple systems to the central logging service 608 for centralized monitoring and analysis.

In an embodiment, the event log manager 604 may be a software tool, a component of an application, or an operating system that enables users to view, analyze, and manage event logs 606 generated by the system or applications. The event log manager 604 allows users to view the contents of various event logs 606 stored on the system.

Figure 6B:
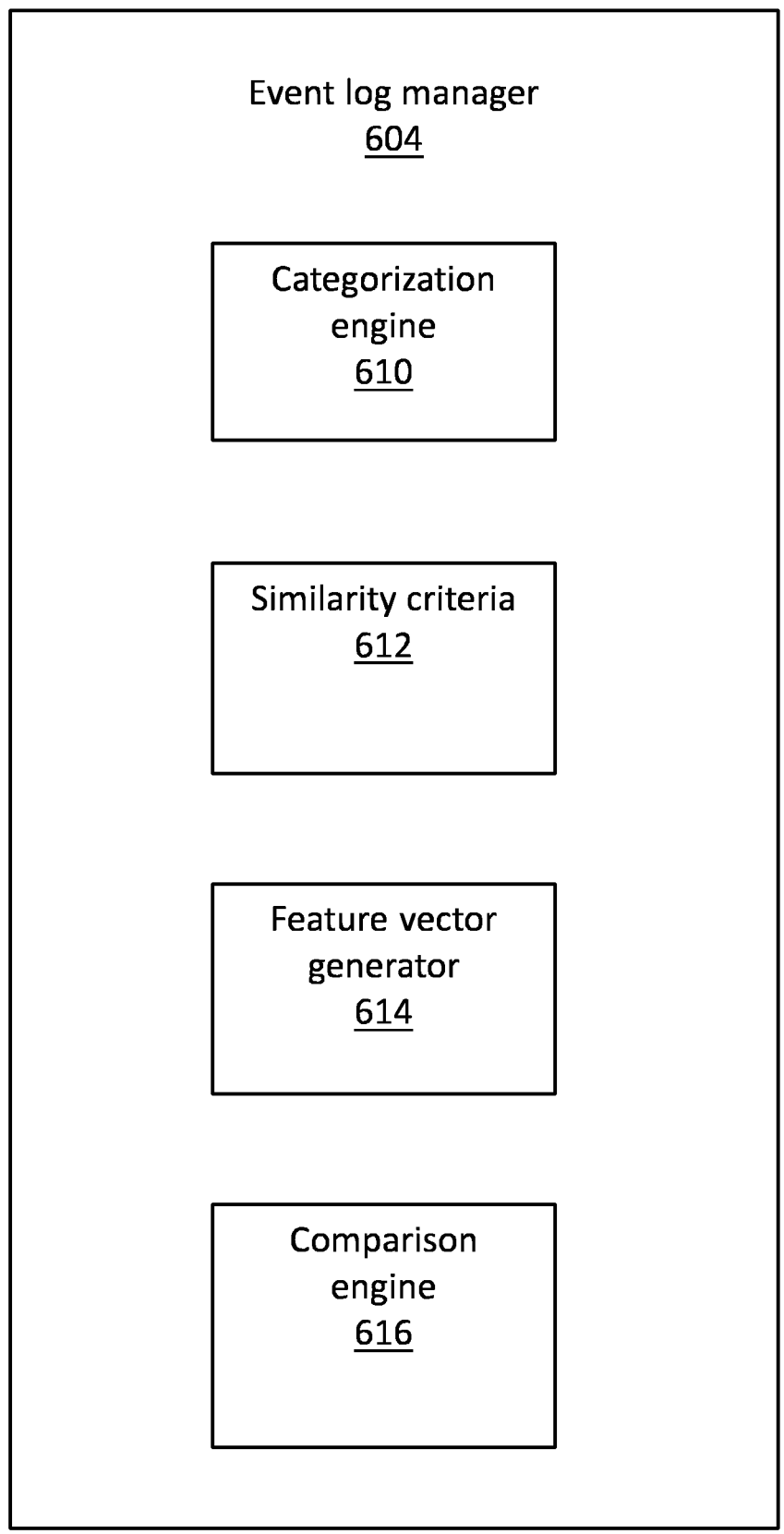
FIG. 6B is an example of an event log manager architecture.

The event log managers 604 may be used as tools for system administrators and IT professionals to maintain system health, troubleshoot issues, monitor security events, and gather valuable insights about the overall system performance. Different operating systems may have their own built-in event log managers 604. Furthermore, as illustrated in FIG. 6B, the event log managers 604 may include a categorizing engine 610, similarity criteria 612, a feature vector generator 614, and a comparison engine 616.

The categorizing engine 610 may be a software component or system that classifies or categorizes data, information, or objects into predefined categories or classes based on certain criteria or characteristics. In one embodiment, the categorizing engine 610 is a type of machine learning or artificial intelligence technology that uses algorithms to assign items to specific categories without human intervention.

One purpose of the categorizing engine 610 is to organize and manage large volumes of unstructured or semi-structured data by assigning them to appropriate categories. The categorizing engine 610 can be used for content organization, customer support, email filtering, sentiment analysis, e-commerce product categorization, fraud detection, etc.

The categorization engines 610 may use various machine learning techniques, such as supervised learning, unsupervised learning, or deep learning, to learn from labeled training data and then apply that knowledge to categorize new, unseen data. The quality of the categorization may depend on the accuracy of the underlying models and the richness and quality of the training data.

The event log manager 604 may further encompass the similarity criteria 612 that may be quantitative methods used to determine the similarity or dissimilarity between two objects, data points, or entities. The similarity criteria 612 may be employed in data analysis, machine learning, information retrieval, pattern recognition, recommendation systems, to name a few.

In one embodiment, the similarity criteria 612 compare the characteristics or features of two entities such as log entries, for example, and compute a numerical value that represents their similarity. In another embodiment, the higher the value, the more similar the entities are, and vice versa. There may be different types of similarity criteria 612, depending on the nature of the data and the specific application.

One embodiment of the present application uses cosine similarity for the similarity criteria 612. Cosine similarity may be used in text mining and natural language processing, where cosine similarity may measure the cosine of the angle between two non-zero vectors. One of the applications of the cosine similarity is using the comparison engine 616 to compare documents or texts represented as vectors of word frequencies created by feature vector generator 614.

In one embodiment, the feature vector generator 614 is a component or process that transforms raw data or input of an event record into a structured and numerical representation known as a feature vector. The feature vector generator 614 may, for example, generate a feature vector from a subset or set of attributes associated with the event record. The event records may be created with their vector representations and used for numerical comparisons with other event records, i.e., with other feature vectors associated with the event records.

A feature vector may be a list of numeric values that represent the relevant characteristics or features of an object, sample, or data point. The feature vectors may be used as inputs to various machine learning algorithms, statistical models, or data analysis techniques.

The feature vector generator 614 may create a feature vector by converting the raw data or input into a format that can be easily understood and processed by machine learning algorithms. The choice of features in the vector may determine the information that the model will use to make predictions or perform an analysis. The process typically involves data preprocessing, feature extraction, feature encoding, and feature representation.

In one embodiment, before creating the feature vector, the raw data may need to undergo various preprocessing steps, such as cleaning, normalization, or scaling to ensure that the raw data is in a format suitable for analysis. In another embodiment, the feature extraction may involve selecting relevant features from the raw data that best capture the essential information needed for the specific task. Feature extraction techniques can range from simple methods, like selecting specific columns in a dataset, to more complex methods, such as dimensionality reduction or feature engineering. In yet another embodiment, categorical features or non-numeric data are encoded into numerical values for inclusion in the feature vector. Once the features are extracted and encoded, they may be organized into a structured vector, forming the feature vector for each data point.

For example, in an instance of classifying a dataset of images, the feature vector generator may take each image and extract relevant features, such as color histograms, edge orientations, or texture descriptors and organize them into a numerical vector. This vector could then be used as input to a machine learning algorithm to train a classifier for image categorization.

In one embodiment, the comparison engine 616 may use numerical similarity measures to compare documents or texts represented as vectors of word frequencies created by feature vector generator 614. The comparison engine 616 may be a system or application that is designed to compare multiple items, data sets, or entities to identify similarities, differences, or relationships between them. One purpose of the comparison engine 616 may be to facilitate decision-making, analysis, or evaluation by presenting relevant information side-by-side for adequate comparison. In one example, the comparison engine 616 may be configured to compare event records to compute a similarity score.

The operation of the comparison engine 616 may depend on the type of data being compared and the specific requirements of the application. The comparison engine 616 may employ various algorithms and techniques to process and analyze the data, calculate similarities or differences, and present the results in a user-friendly format. One embodiment of the present application uses numerical similarity measures, such as cosine similarity, for example.

5. Semantic Deduplication Operations

Figure 7:
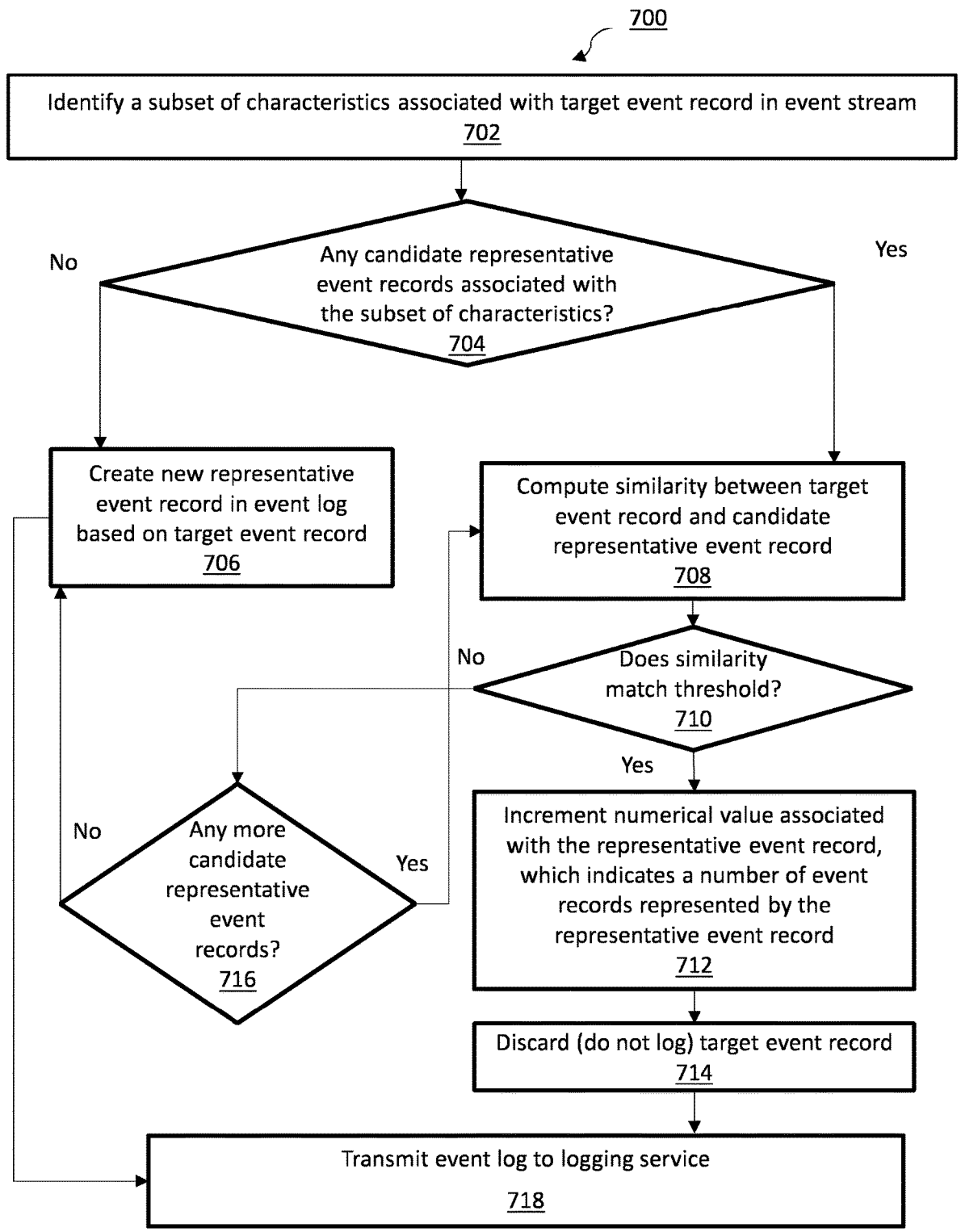
FIG. 7 illustrates an example of steps of a semantic deduplication operation.

FIG. 7 illustrates an example set of operations for semantic deduplication in accordance with one or more embodiments. One or more operations illustrated in FIG. 7 may be modified, rearranged, or omitted. Accordingly, the particular sequence of operations illustrated in FIG. 7 should not be construed as limiting the scope of one or more embodiments.

In step 702, the system identifies a first subset of characteristics associated with a target event record received in an event stream. In one embodiment, the individual characteristics may be the service type, the channel type, and the topic name, to name a few, and these characteristics may be included in the first subset of the characteristics that may define an event category.

The event stream may include, for example, application events, security events, system events, and custom events generated by installed software. Users can apply filters and search criteria to find specific events of interest. In one embodiment, the event log manager 604 may determine detailed information about each event, including timestamps, event IDs, severity levels, source, and description. Users can configure the behavior of event logging, such as specifying the types of events to log, setting log size limits, and enabling or disabling specific event categories.

In step 704, the system determines if there are any candidate representative event records associated with the first subset of characteristics. In an example, each identified combination of a subset of characteristics is mapped to a corresponding representative event record. The representative event record represents the event records associated with the same subset of characteristics. Once the first subset of characteristics is identified, the system determines if any event record (e.g., representative event record) has already been mapped to the first subset of characteristics corresponding to the target event record.

In one example, a hierarchical tree may be used to represent the various combinations of characteristics. Each leaf in the hierarchical tree represents a particular combination of characteristics. Determining if a representative event record exists for the first subset of characteristics, corresponding to the target event record, may include identifying a leaf node corresponding to the first subset of characteristics and determining if any representative event record is stored in association with that leaf node. In another example, there is an event record that is the already existing root element of a (first) set, disjointed from any other set by the event record's own subset of characteristics.

The system determines if an existing event category includes the individual characteristics (the first subset of characteristics) of the target event record. If such a category does exist, the category is already represented by a candidate representative event record, i.e., the root element of the (first) disjoint set. The system may determine that such an event category exists if the category includes an event record that, indeed, is the candidate representative event record (the root element) of this event category referred to as a (first) disjoint set. Otherwise, the decision of step 704 may be that no candidate representative event record is found, i.e., that no log entries exist representing the (first) disjoint set.

In step 706, the system creates a new representative event record in an event log based on the target event record. The system creates the new representative event record in response to determining (in step 704) that no candidate representative event records were found with the same subset of characteristics as the target event record.

Creating a new representative event record may include generating the new representative event record based on all or a portion of the information in the target event record. In an example, the new representative event record includes a portion of the information from the target event record that has been requested by the logging service 608. Other information from the target event record that is not used in generation of the representative event record may be discarded.

For example, the feature vector generator 614 may transform raw data or input regarding the target event record into a structured and numerical representation known as a feature vector of the target event record. The feature vector generator 614 may then generate a feature vector from a subset or set of attributes associated with the target event record and in step 706, assign the feature vector to a new representative record. Accordingly, the newly created feature vector of the representative record could be used for future comparisons, e.g., for cosine similarity computations between the new feature vector (and the representative event record accordingly) and any subsequent feature vectors that correspond to future event records.

A feature vector may be a list of numeric values that represent the relevant characteristics or features of an object, sample, or data point. The feature vectors may be used as inputs to various machine learning algorithms, statistical models, or data analysis techniques.

The feature vector generator 614 may create a feature vector by converting the raw data or input into a format that can be easily understood and processed by machine learning algorithms. The choice of features in the vector may determine the information that the model will use to make predictions or perform analysis. The process may involve data preprocessing, feature extraction, feature encoding, and feature representation.

In one embodiment, if the target event record from step 702 is associated with a subset of characteristics that have not yet appeared in the existing log entries, then the target event record from step 702 would establish the (first) disjoint set, i.e., a new event category that the target event record would represent. Accordingly, in step 706, the system would create a new representative event record in the event log 606 based on the target event record from step 702. In one example, step 706 would be the resulting step of an instance where no root element of the (first) disjoint set is found in step 704.

The establishment of the new disjoint set would be transmitted to the logging service 608 in step 718. Consequently, the event log manager 604 would update the event log 606 by adding a new root element with a fresh subset of characteristics, and the newly updated event log 606 would be used for comparison with the future events.

The system executes step 708 in response to identifying one or more candidate representative event records associated with the subset of characteristics associated with the target event record. In step 708, the system computes a similarity between the target event record and the candidate representative event record(s) identified in Step 704. The target event record and the candidate representative event record(s) may be associated with the same subset of characteristics for a first set of attributes identified in Step 702. The system may compute the similarity score based on respective characteristics of the target event record and the candidate representative event record(s) for a second set of attributes. In one embodiment, the comparison technique may use the similarity criteria 612 to determine cosine similarity between a second set of characteristics for the target event record and a second set of characteristics for the candidate representative event record.

In one embodiment, cosine similarity is a metric used to measure the similarity between two vectors in a multi-dimensional space. This technique may determine the cosine of the angle between the vectors, representing the degree of alignment or similarity between them. Cosine similarity may measure the cosine of the angle between the non-zero vectors for the two compered event records. In one embodiment, the comparison engine 616 compares the two event records as vectors of word frequencies created by feature vector generator 614.

The two vectors to be compared may be represented as numerical feature vectors in a vector space. Each dimension of the vector may represent a feature or attribute. Cosine similarity may range from −1 to 1, where −1 indicates completely opposite or dissimilar vectors, 0 indicates orthogonality or independence, and 1 indicates identical or highly similar vectors. In another embodiment, the cosine similarity value measures the cosine of the angle between the two vectors, and the larger the value, the closer the vectors are in direction and similarity.

Next, in step 710, the system may analyze the results of the similarity computation in step 708 and produce a decision accordingly. In one embodiment, the resulting cosine similarity values may be compared against a predetermined threshold of similarity. For example, if the threshold of similarity is set at 0.8 (or any other value deemed suitable), then the cosine similarity values computed in step 708 that exceed the 0.8 threshold would result in an affirmative answer in step 710. Alternatively, the answer would be negative, i.e., any existing similarity would be determined insufficient.

In one embodiment, in step 708, the system compares numerical feature vectors of the target event record and the detected candidate representative event record with the first subset of characteristics in a vector space. In another embodiment, the feature vector generator 614 creates numerical feature vectors based on the semantic features of the target event record from step 702 and the candidate representative event record (the root element). Further, the comparison engine 616 may compute a semantic match score between the target event record and the candidate representative event record. In step 710, the computed semantic match score may be compared with the predetermined threshold of similarity (e.g., 0.8, or any other threshold value considered appropriate).

If the similarity computed in step 710 is considered sufficient, for example, because the computed score exceeds the threshold, then the event log manager 604 increments a numerical value associated with the representative event record in step 712. The numerical value may indicate a number of event records represented by the representative event record.

In one embodiment, the numerical value in step 712 is a counter that counts event records that have, first, been allocated to the specific disjoint set represented by the representative event record (root element), and second, been determined sufficiently similar to the representative event record. In another embodiment, the criteria for the allocation of the target event record to the first disjoint set may require an exact matching of the first subset of characteristics, while the criteria for the similarity decision may require exceeding a similarity threshold (as opposed to the exact matching).

Next, in step 714, the event log manager 604 may perform the deduplication by omitting the target event record from the event log 606. Namely, action in step 714 may be a result of two affirmative decisions in steps 704 and 710. Specifically, in this instance, the target event record is determined to have the same set of characteristics as an existing candidate representative event record, and, subsequently, a cosine similarity computation produced a sufficient similarity score between the two event records. Accordingly, the system may ascertain that logging the target event record would be redundant and wasteful.

In one embodiment, the event log manager 604 may perform the deduplication by not logging the target event record in the first disjoint set that target event record was allocated to due to the target event record's similarity to the already existing root element of the first disjoint set, i.e., the representative event record. In another embodiment, the removal of the target event record from the event log 606 may be complemented by incrementing the numerical value in step 712. Specifically, while step 714 may remove the event records determined sufficiently similar to the root element of the set, thereby reducing the event log 606, step 712 may provide information about the magnitude of the achieved deduplication by accounting for the deduplication instances by incrementing the counter.

Lastly, the omission of the target event record and the resulting value of the counter would be transmitted to the logging service 608 in step 718. Consequently, the event log manager 604 would update the event log 606, and the newly updated event log 606 would be used for comparison with the future events.

As mentioned above, the criteria for allocating the target event record to the specific disjoint set may require an exact match of the specific subset of characteristics, while the criteria for the similarity decision may require meeting or exceeding a similarity threshold. In one embodiment, in step 704, the criteria for allocating the target event record to the disjoint set may be met, but in step 710, the criteria for the similarity decision may be unmet, i.e., the computed score may be lower than the threshold. Consequently, step 716 may follow as a decision point on if there are any other candidate representative event records available to compare against. If so, then the process would return to step 708, where the numerical feature vectors of the target event record and the other candidate representative event record would be compared in a vector space, and the computed score would, once again, be evaluated with respect to the threshold in step 710.

If not, a new disjoint set would be formed with the new representative event record in step 706. Subsequently, the establishment of the new disjoint set would be transmitted to the logging service 608 in step 718. Consequently, the logging service 608 would update the event log 606 via the event log manager 604 by adding a new root element with a fresh subset of characteristics, and the newly updated event log 606 would be used for comparison with the future events.

Figure 8A:
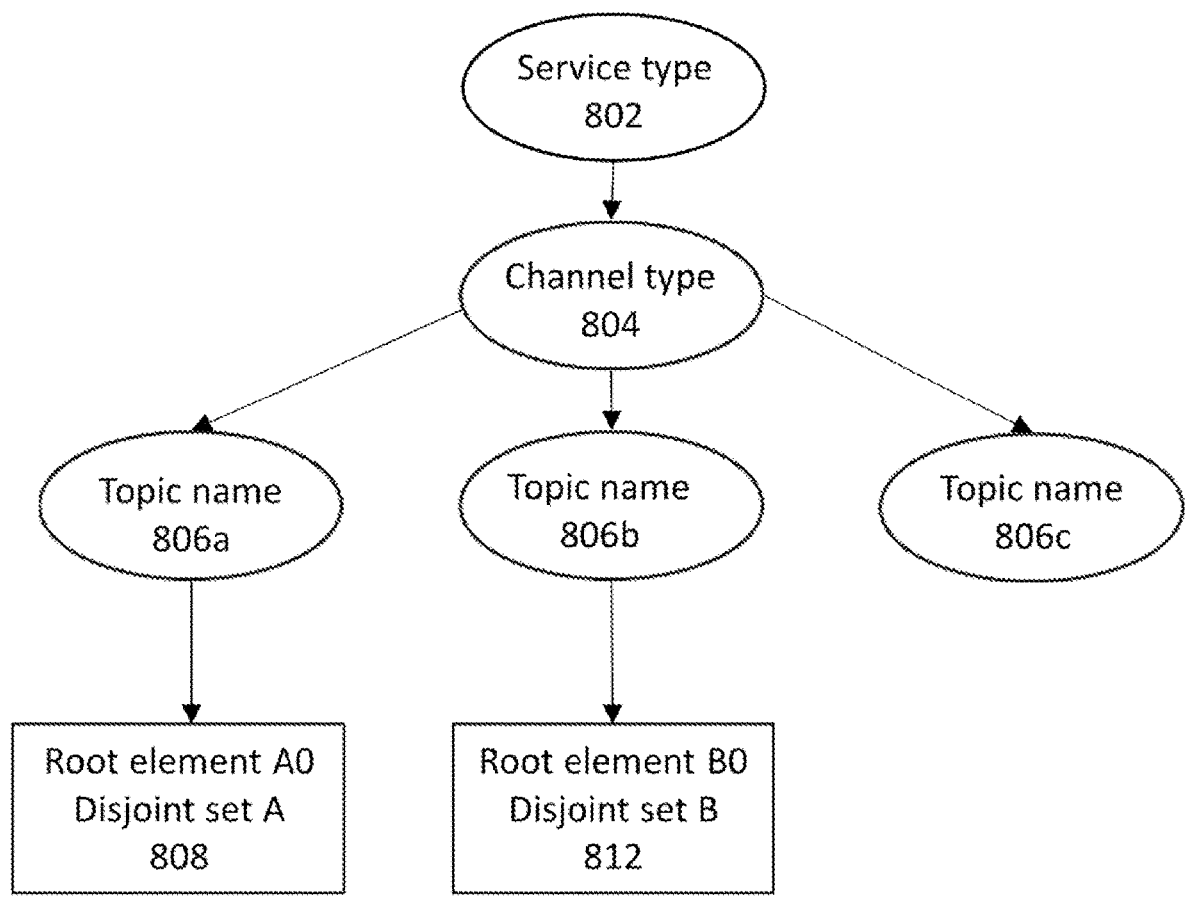
FIGS. 8A-8E illustrate changes made to an event log within the semantic deduplication process.

FIGS. 8A-8E illustrate changes made to an event log within the semantic deduplication process. FIG. 8A shows an embodiment of an event log 606 in an initial state. The logging stream may have characteristics such as service type 802, channel type 804, and topic names 806a-806c, and these characteristics together may define a subset of characteristics.

In step 702, a target event record may appear in the event log 606 with a specific service type 802, channel type 804, and topic names 806a-806c, for example. Accordingly, the first subset of characteristics associated with the target event record is identified. In step 704, the system may determine that no candidate representative event record associated with first subset of characteristics exists in the event log 606; thus, a new disjoint set A may be created in step 706, and the target event record may be logged as the root element A0 808 of the disjoint set A with the first subset of characteristic.

Figure 8B:
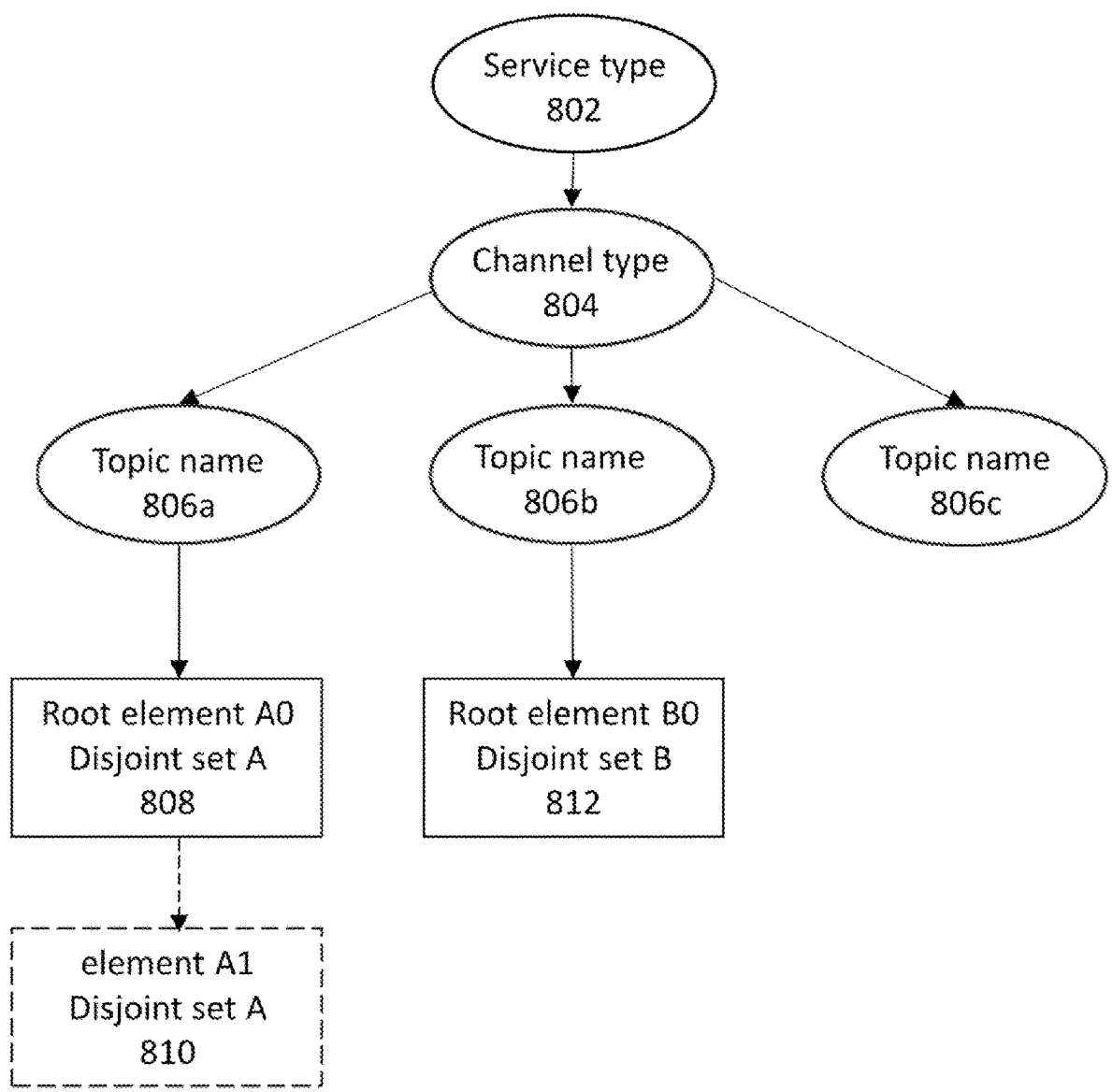

Subsequently, in the embodiment shown in FIG. 8B, a new target event record appears in the event log 606 as per step 702, and the new target event log is associated with new target event record's own subset of characteristics. In this example, the new subset of characteristics is the same as the first subset of characteristics associated with the already logged root element A0 808; as a result, step 704 renders an affirmative decision. Therefore, the new target event log is allocated to the disjoint set A, as element A1 810, together with the root element A0 808.

Subsequently, in step 708, the system computes similarity between the new element A1 810 and the root element A0 808. In one embodiment, a cosine similarity technique is used to measure the semantic similarity between the vectors of the new element A1 810 and the root element A0 808. In step 710, the computed similarity value is compared with a threshold value of 0.9, for example. In this example, the computed similarity value is 0.92, i.e., the computed similarity value is greater than 0.9. Therefore, in step 712, the event log manager 604 increments numerical value associated with the root element A0 808, thereby indicating a number of event records represented by the root element A0 808; concomitantly, however, the new element A1 810 is discarded as per step 714, and the resulting information is sent to the logging service 718 to update the event log 606.

Figure 8C:
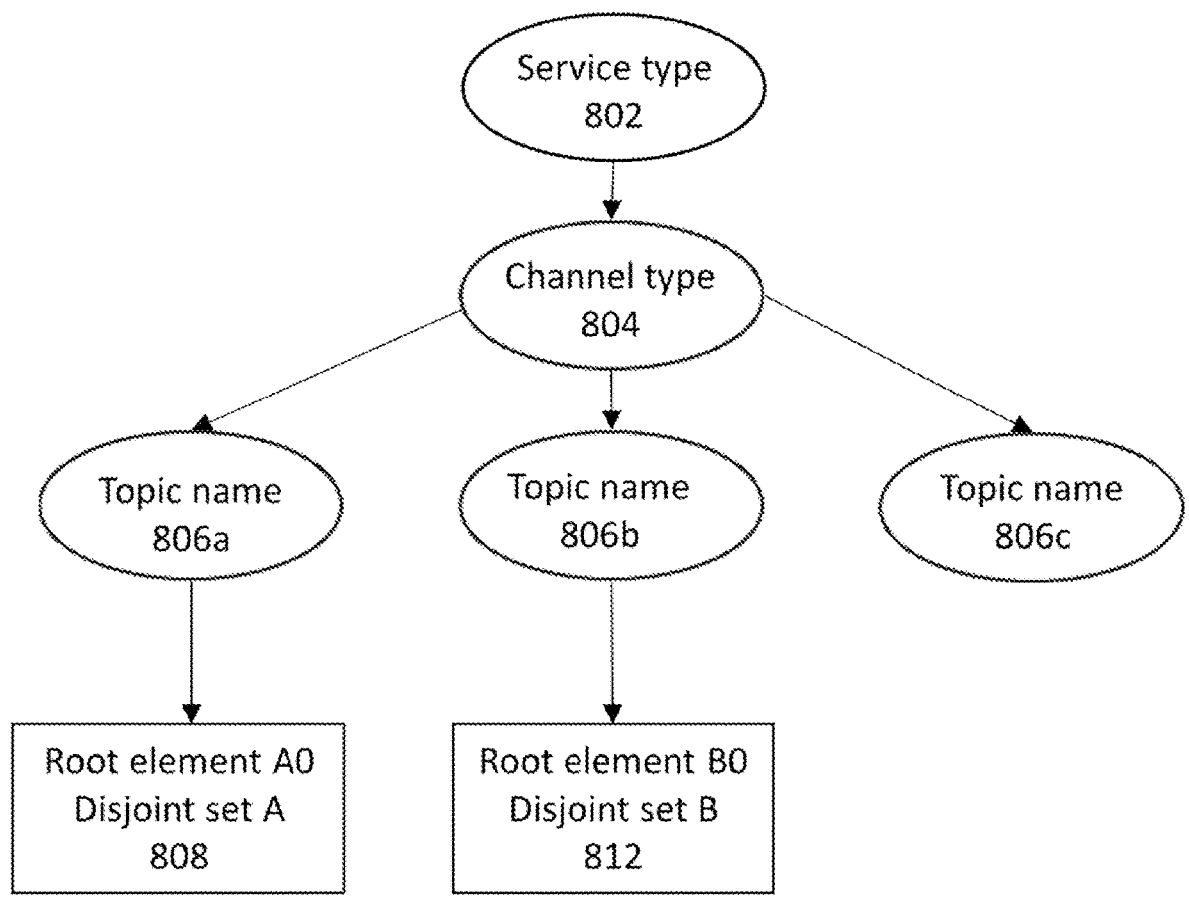

FIG. 8C shows an embodiment of an event log 606, where yet another new target event record appears in the event log 606 as per step 702, and the new target event log is, once again, associated with new target event log's own subset of characteristics. In this example, the new subset of characteristics is not the same as the first subset of characteristics associated with the already logged root element A0 808. As a result, in step 704, the system renders a negative decision. Consequently, the new target event log is not allocated to the disjoint set A; instead, in step 706, a new representative event record (root element B0 812) is created in the event log 606 based on the new target event record, and the root element B0 812 designates a new disjoint set B with the new subset of characteristics.

Figure 8D:
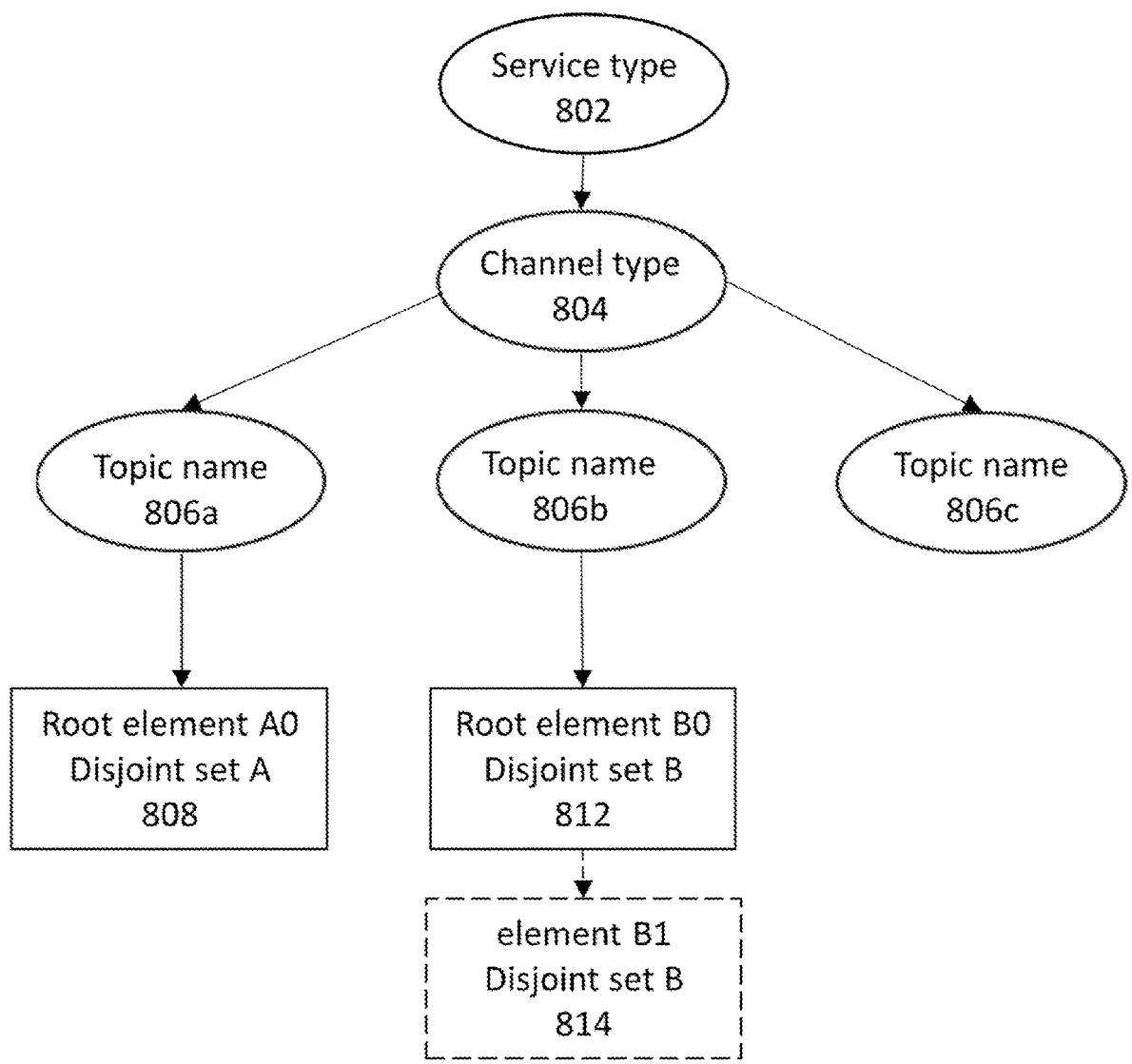

In FIG. 8D, the next new target event record appears in the event log 606 as per step 702, and the new target event log is associated with the new target event log's own subset of characteristics. In this example, the new target event log has the same subset of characteristics of the disjoint set B. Hence, in step 704, an affirmative decision is made, and the new target event log is allocated to the disjoint set B, as element B1 814, together with the root element B0 812.

Subsequently, in step 708 the system computes similarity between the new element B1 814 and the root element B0 812. In one embodiment, a cosine similarity technique is used to measure the semantic similarity between the vectors of the new element B1 814 and the root element B0 812, and in step 710, the computed similarity value is compared with a threshold value of 0.8. In this example, the computed value is 0.85, i.e., the computed similarity value is greater than 0.8. Therefore, in step 712, the event log manager 604 increments numerical value associated with the root element B0 812, thereby indicating a number of event records represented by the root element B0 812. At the same time, the new element B1 814 is discarded as per step 714, and this information is transmitted to the logging service 718 to update the event log 606.

Figure 8E:
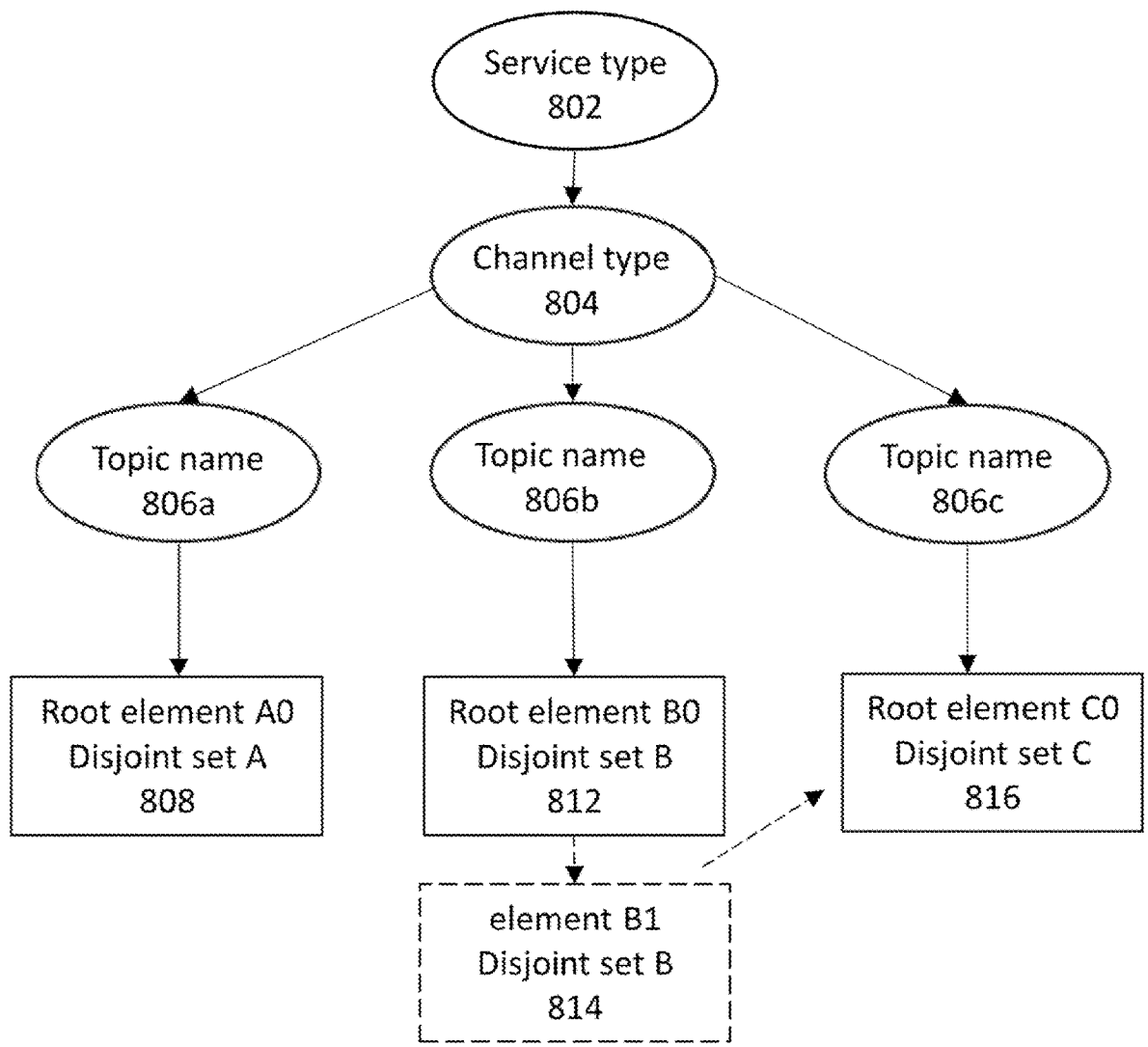

In FIG. 8E, the next new target event record appears in the event log 606 as per step 702, and the new target event log is associated with the new target event log's own subset of characteristics. In this example, the new target event log has the same subset of characteristics of the disjoint set B. Accordingly, in step 704, an affirmative decision is made, and the new target event log is temporarily allocated to the disjoint set B, as element B1 814, together with the root element B0 812.

Subsequently, in step 708 the system computes similarity between the new element B1 814 and the root element B0 812. In one embodiment, a cosine similarity technique is used to measure the semantic similarity between the vectors of the new element B1 814 and the root element B0 812, and in step 710, the computed similarity value is compared with a threshold value of 0.8. In this example, the computed value is 0.75, i.e., the computed similarity value is lower than 0.8. Thus, in step 710 a negative determination ensues, leading to the inquiry in step 716 if any other candidate representative event records exist with the subset of characteristics of disjoint set B. Being that the answer is negative, the new target event log is no longer allocated to the disjoint set B (or A). Instead, in step 706, new representative event record (root element C0 816) is created in the event log 606 based on the new target event record, and the root element C0 816 designates a new disjoint set C with the new subset of characteristics.

6. Autoscaling Deduplication Architecture

Figure 9:
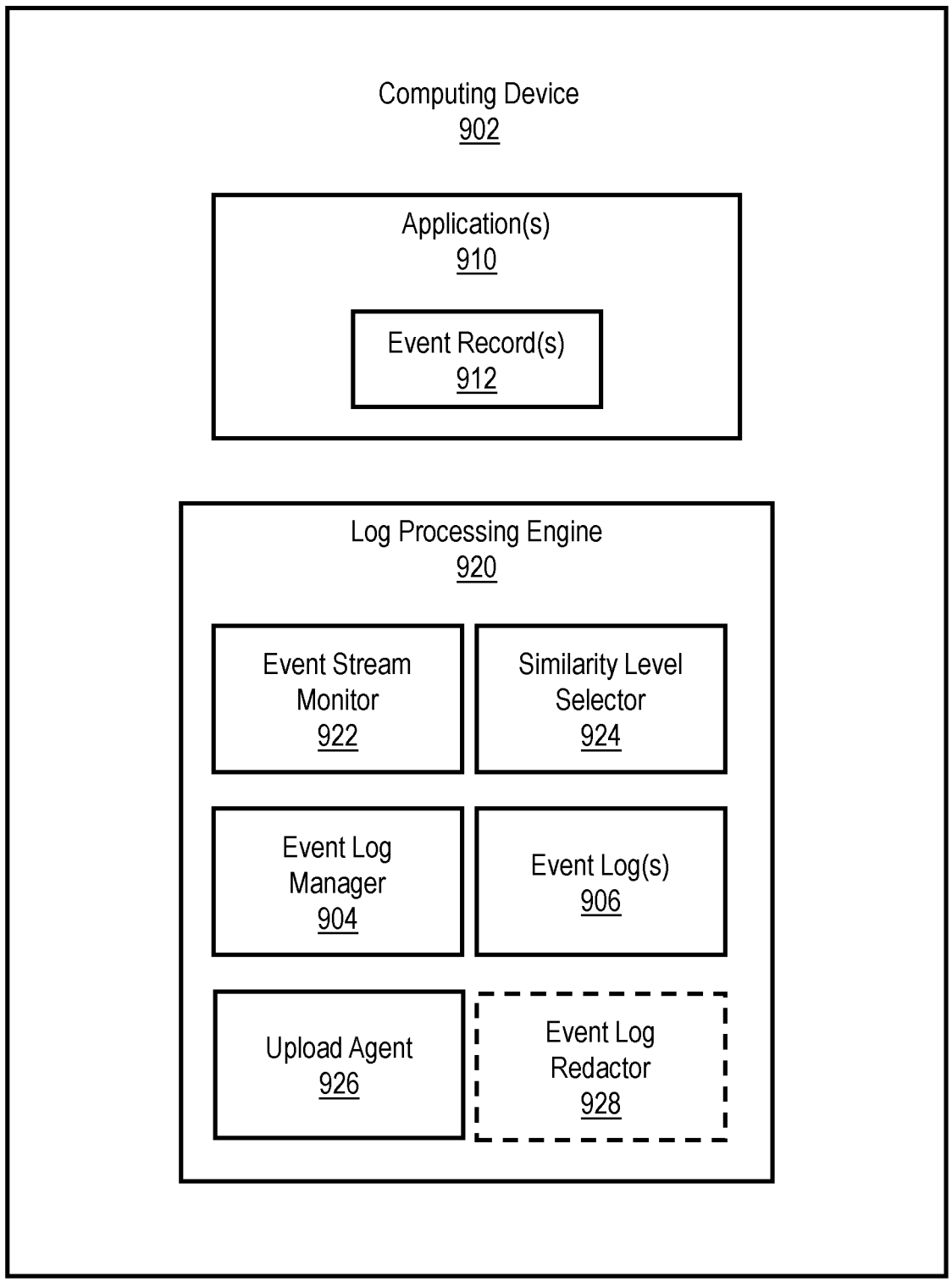
FIG. 9 is an example of an autoscaling deduplication architecture.

FIG. 9 illustrates an example of a computing device 902 that can enable, disable, and scale a degree of deduplication. The computing device 902 may be in communication with a logging service, e.g., logging service 608, over a link, e.g., link 609.

The computing device may include one or more applications 910. The application may generate event records 912 while executing on the computing device. The event records may include event logs.

The computing device may include a log processing engine 920. The log processing engine 920 refers to hardware and/or software configured to perform operations described herein for autoscaling deduplication operations. Examples of operations for autoscaling deduplication operations are described below with reference to FIG. 10.

The log processing engine 920 may include one or more functional components, such as an event stream monitor 922, a similarity level selector 924, an event log manager 904, an upload agent 926, and an event log redactor 928. The log processing engine 920 may be a stand-alone application configured to receive event records from an application 910. Alternatively, the log processing engine 920 may be a set of library files and resources that an application 910 can incorporate into the operations of the application.

The event stream monitor 922 may monitor one or more real-time characteristics of an event stream. In one or more embodiments, the event stream represents the output of event records 912 from an application 910. The one or more real-time characteristics can include, for example, the number of event records output within a time window, also referred to as the volume of event records. In one or more embodiments, the time window is between 3 and 10 seconds. The one or more real-time characteristics can include the size of each event record.

The similarity level selector 924 may receive the real-time characteristics of the event stream from the event stream manager 922. The similarity level selector 924 may determine a similarity threshold or other similarity level, based on the real-time characteristics, to be used by the event manager 904 when semantic deduplication is enabled. The similarity level selector 924 may use polynomial regression to determine a similarity level. Alternatively, the similarity level selector may use a machine learning algorithm to determine a similarity level.

The event log manager 904 may determine when to enable and disable semantic deduplication based on the real-time event stream characteristics. The event log manager 904 may perform semantic deduplication when semantic deduplication is enabled. The event log manager 904 may perform semantic deduplication in a manner analogous to process described above with respect to the event log manager 604 using the similarity level determined by the similarity selector.

Upload agent 926 may transmit event logs 906 to the logging service 608. An event log 906 may include one or more event records 912 that have not yet been sent to the logging service. Upload agent 926 may transmit the event logs to the logging service periodically. For example, the upload agent may transmit the event logs at the end of the time window used by the event stream monitor or at a different frequency.

The log processing engine 920 may optionally include an event log redactor 928. Event log redactor 928 may remove personal identifying information (PII) or other sensitive or confidential information from event records prior to storage in an event log. Event log redactor 928 may, for example, remove data from specific fields in an event record. Additionally, or alternatively, event log redactor 928 may include a machine learning model trained to recognize PII or other sensitive information. Event log redactor 928 may redact the information recognized by the machine learning model.

7. Autoscaling Deduplication Operations

Figure 10:
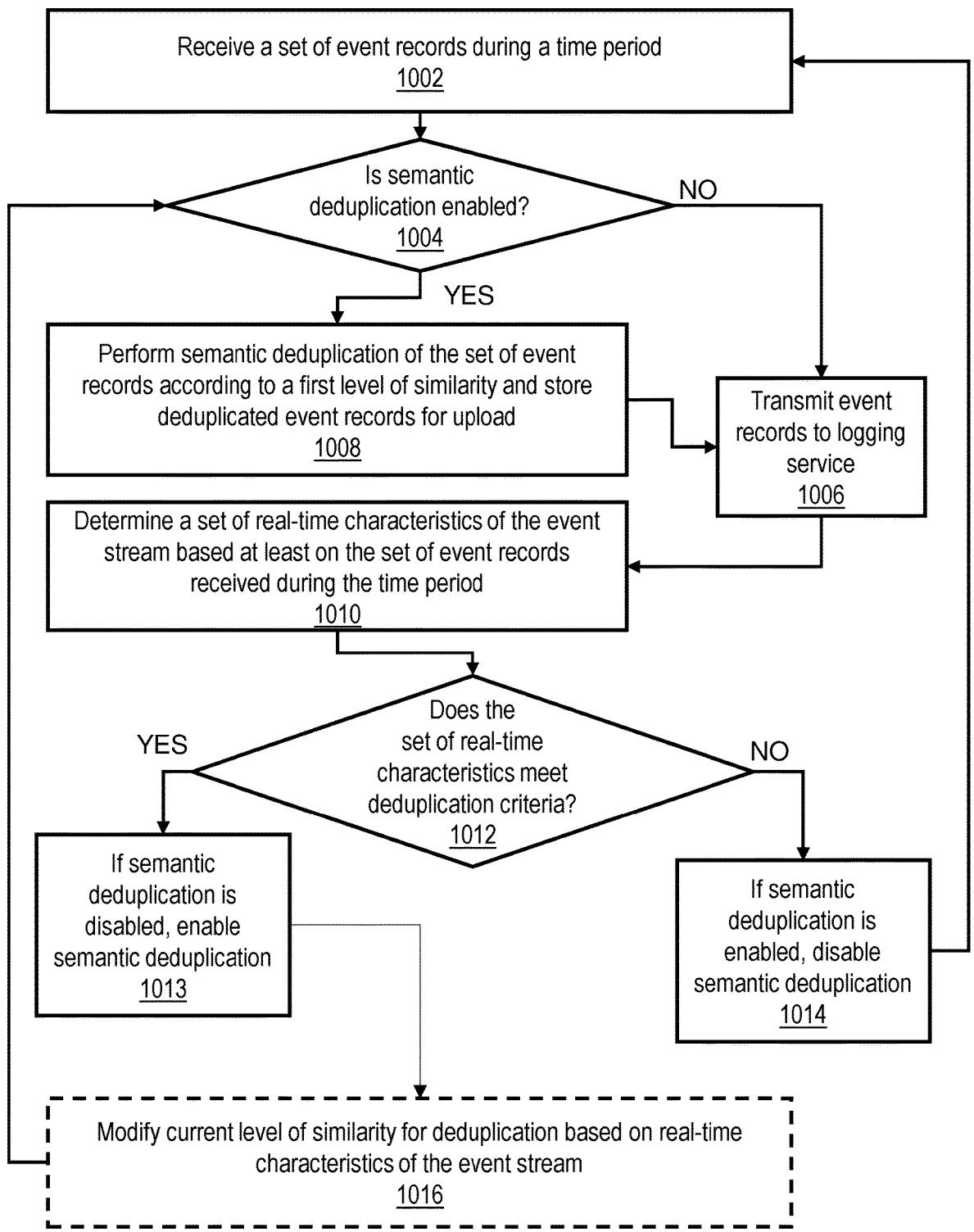
FIG. 10 illustrates an example of autoscaling deduplication operations.

FIG. 10 illustrates an example set of operations for autoscaling semantic deduplication in accordance with one or more embodiments. One or more operations illustrated in FIG. 10 may be modified, rearranged, or omitted. Accordingly, the particular sequence of operations illustrated in FIG. 10 should not be construed as limiting the scope of one or more embodiments.

In one or more embodiments, the system receives a set of event records during a time period (Operation 1002). For example, an application may push one or more event records to the system during the time period. Alternatively, the system may pull one or more event records from the application.

In one or more embodiments, the system determines if semantic deduplication is enabled (Operation 1004). For example, the system may check a setting maintained by the event log manager that indicates that semantic deduplication is enabled or disabled.

In one or more embodiments, if semantic deduplication is not enabled, the system transmits the event records to a logging service (Operation 1006). The system may write the event records directly to an event log. The system may transmit the event log to the logging service at predetermined intervals or when an event log has reached a predetermined size.

In one or more embodiments, if semantic deduplication is enabled, the system performs semantic deduplication of the set of event records according to a first level of similarity and stores deduplicated event records for upload (Operation 1008). The system may perform deduplication operations as described above with respect to FIG. 7. The system may determine that a first subset of the event records do not meet a current level of similarity defined by one or more similarity criteria in relation to any of a plurality of stored representative records in an event log. The system may then add a first set of new representative records that represent the first subset of event records to the plurality of stored representative records in the event log. The system may determine that a second subset of the event records do meet the current level of similarity and may discard the second subset of event records without adding the second subset to the plurality of stored representative records.

In one or more embodiments, the system may increase a counter associated with a stored representative record to indicate that another sufficiently similar record was received. The counter may provide information about the number of times that a similar event record was generated even if current conditions prevent the logging of each event record within a time period.

In one or more embodiments, the system determines a set of real-time characteristics of the event stream based on the set of event records received during the time period (Operation 1010). The system may, regardless of whether semantic deduplication is enabled, determine the set of real-time characteristics, such as the number of event records and/or the size of event records received in the time period. In one or more embodiments, the system uses the token bucket algorithm to determine the real-time characteristics of the event stream.

In one or more embodiments, the system determines if the set of real-time characteristics meet deduplication criteria (Operation 1012). The system may, for example, compare the volume of received event records to a threshold volume. If the volume meets or exceeds the threshold, the system determines that the set of real-time characteristics meets the deduplication criteria. The system may compare the size of the event records to a threshold size. For example, the system may use an average or mean size of the event records received in the time period or the size of the largest received event record to compare to the size threshold. In one or more embodiments, the logging service may have a quota or other limit on how many event logs the logging service can receive and process in a time period. The deduplication criteria may be determined according to the quota or limit of the logging service.

In one or more embodiments, if the set of real-time characteristics meet deduplication criteria, the system enables semantic deduplication if semantic deduplication was disabled (Operation 1013). The system may update the setting maintained by the event log manager to indicate that semantic deduplication is enabled.

In one or more embodiments, the system modifies the current level of similarity for deduplication based on the real-time characteristics of the event stream (Operation 1016). The system may use a polynomial regression model trained to recommend a level of similarity, e.g., a similarity index, based on the real-time characteristics of the event stream from the previous time window. The polynomial regression model may be trained to recommend lower similarity indexes resulting in lower event log granularity as the event log volume increases. When the recommended level of similarity differs from the current level of similarity, the system updates the current level of similarity to the recommended level of similarity.

The polynomial regression model may be trained to recommend a level of similarity based on the time the system took to process a previous set of event records. For example, when the processing time exceeds a time threshold, such as the time window used by the event stream monitor, the model may recommend a lower level of similarity to reduce the number of event records added to the event log. The polynomial regression model may be trained to recommend a level of similarity based on resources available for processing a subsequent set of event records. For example, if a previously unavailable processing resource becomes available, the model may recommend a higher level of similarity so that more event records can be included in the event logs.

Additionally, or alternatively, the system may use a machine learning model trained to recommend a level of similarity based on the real-time characteristics of the event stream from the previous time window. The machine learning model may be trained to determine a level of similarity that can be used to generate a target size of a target set of representative records based on characteristics of a target set of event records. For example, the machine learning model may be trained to recommend a level of similarity operative to generate an event log of a particular size or a particular number of event records.

In one or more embodiments, if the set of real-time characteristics does not meet deduplication criteria, the system disables semantic deduplication if semantic deduplication was previously enabled (Operation 1014). The system may update the setting maintained by the event log manager to indicate that semantic deduplication is disabled.

8. Machine Learning

Figure 11:
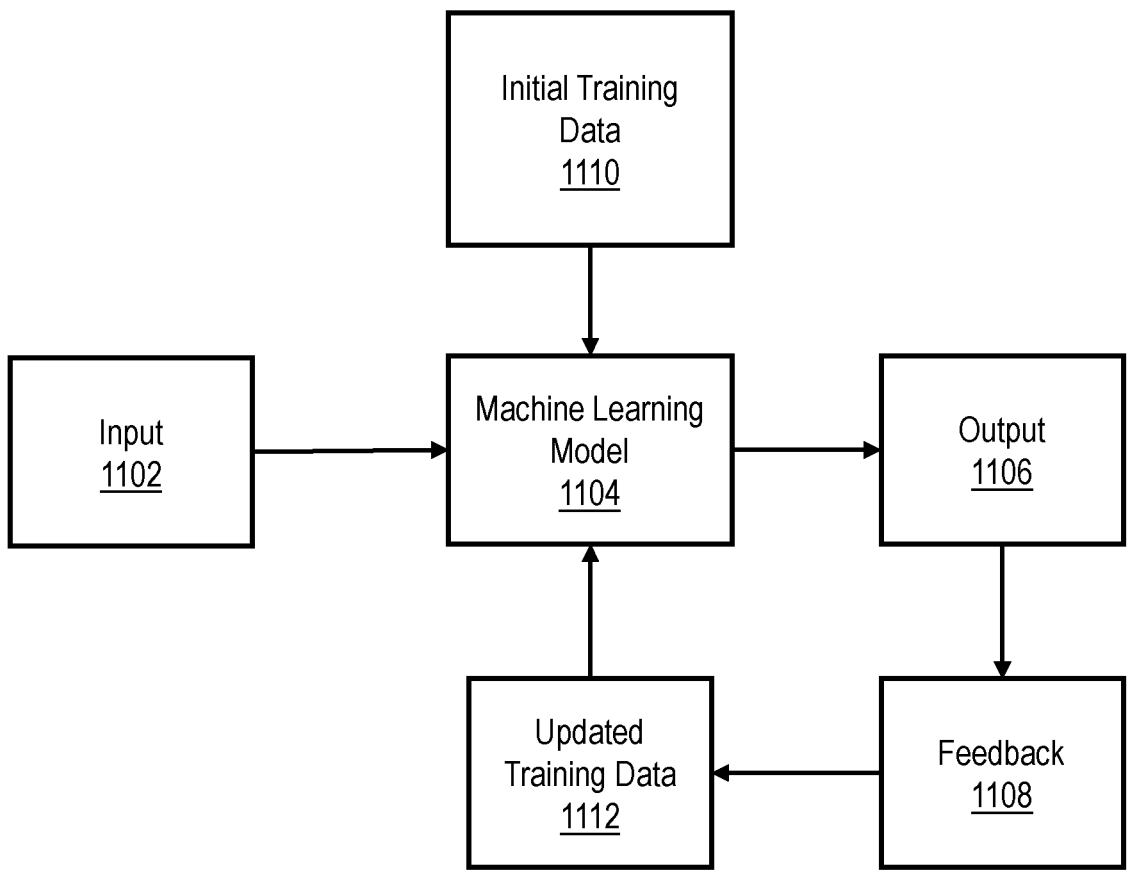
FIG. 11 illustrates an example of a machine learning system.

FIG. 11 illustrates a machine learning process according to one or more embodiments. A machine learning model 1104 may be iteratively trained on initial training data 1110 to map a set of input variables to an output variable. The initial training data 1110 may include characteristics of a historical set of event records; a previous level of similarity used for selecting a particular set of representative records from the historical set of event records; the size of the particular set of representative event records that was generated based the historical set of event records; and the previous level of similarity.

Once trained initially, the machine learning model 1104 may act on an input 1102, such as the current level of similarity, the current set of event records, and/or the determined real-time characteristics of the event stream. The output 1106 may be a target level of similarity that can be used for generating a target size of a target set of representative event records to be logged.

The training data may be updated based on, for example, feedback 1108 on the accuracy of the current machine learning model 1104. Updated training data 1112 is fed back into the machine learning algorithm that, in turn, updates the machine learning model 1104.

A machine learning model 1104 is trained such that the model best fits the datasets of training data to the labels or outputs of the training data. Additionally, or alternatively, machine learning model 1104 is trained such that when the model is applied to the datasets of the training data, a maximum number of results determined by the model matches the labels or outputs of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In the foregoing specification, the one or more embodiments have been described with reference to numerous specific details that may vary from implementation to implementation. The specification and drawings are, accordingly, to be regarded in an illustrative rather than a restrictive sense. The sole and exclusive indicator of the scope of the one or more embodiments, and what is intended by the applicants to be the scope of the one or more embodiments, is the literal and equivalent scope of the set of claims that issue from this application, in the specific form that such claims issue, including any subsequent correction.

What is claimed is:

1. One or more non-transitory computer readable media comprising instructions which, when executed by one or more hardware processors, causes performance of operations comprising:
   receiving a first plurality of event records in an event stream during a first period of time;
   responsive to determining that a first subset of the event records, of the first plurality of event records received in the event stream, do not meet a first level of similarity defined by one or more similarity criteria in relation to any of a plurality of stored representative records:
   adding a first set of new representative records, that represent the first subset of event records, to the plurality of stored representative records;
   determining a first set of real-time characteristics of the event stream based at least on the first plurality of event records received during the first period of time;
   based on the first set of real-time characteristics of the event stream, selecting a second level of similarity for selection of representative records for future event records to be received in the event stream;
   modifying the one or more similarity criteria to define the second level of similarity instead of the first level of similarity, wherein the second level of similarity is different than the first level of similarity;
   receiving a second plurality of event records in the event stream during a second period of time, wherein the second period of time is subsequent to the first period of time; and
   responsive to determining that a second subset of the event records, of the second plurality of event records received in the event stream, do not meet the second level of similarity defined by one or more similarity criteria in relation to any of a second plurality of stored representative records: adding a second set of new representative records, that represent the second subset of event records, to the second plurality of stored representative records.

2. The one or more non-transitory computer readable media of claim 1, wherein the first set of real-time characteristics of the event stream comprise a volume of event records received during the first period of time.

3. The one or more non-transitory computer readable media of claim 1, wherein the second level of similarity is based further on one or more of: processing time of the first plurality of event records or resources available for processing the second plurality of event records.

4. The one or more non-transitory computer readable media of claim 1, wherein the operations further comprise computing the second level of similarity based on a polynomial regression function.

5. The one or more non-transitory computer readable media of claim 1, wherein the operations further comprise:
   obtaining training data sets, a particular training data set of the training data sets comprising:
      characteristics of a historical set of event records;
      a previous level of similarity used for selecting a particular set of representative records from the historical set of event records; and
      a size of the particular set of representative records that was generated based the historical set of event records and the previous level of similarity;
   training a machine learning model based on the training data sets to determine a target level of similarity that can be used for generating a target size of a target set of representative records based on characteristics of a target set of event records; and
   applying the machine learning model to determine the second level of similarity.

6. The one or more non-transitory computer readable media of claim 5, wherein applying the machine learning model comprises applying the machine learning model to characteristics of the second plurality of event records and a target size for the second plurality of stored representative records.

7. The one or more non-transitory computer readable media of claim 1, wherein determining the first set of real-time characteristics of the event stream comprises using a token bucket algorithm to determine a number of event records received during the first period of time.

8. The one or more non-transitory computer readable media of claim 1, wherein the operations further comprise:
   determining a second set of real-time characteristics of the event stream based at least on the second plurality of event records received during the second period of time;
   based on the second set of real-time characteristics of the event stream, selecting all event records in a third period of time as a third set of representative records; and
   storing the third set of representative records.

9. A method comprising:
   receiving a first plurality of event records in an event stream during a first period of time;
   responsive to determining that a first subset of the event records, of the first plurality of event records received in the event stream, do not meet a first level of similarity defined by one or more similarity criteria in relation to any of a plurality of stored representative records: adding a first set of new representative records, that represent the first subset of event records, to the plurality of stored representative records;
   determining a first set of real-time characteristics of the event stream based at least on the first plurality of event records received during the first period of time;
   based on the first set of real-time characteristics of the event stream, selecting a second level of similarity for selection of representative records for future event records to be received in the event stream;
   modifying the one or more similarity criteria to define the second level of similarity instead of the first level of similarity, wherein the second level of similarity is different than the first level of similarity;

receiving a second plurality of event records in the event stream during a second period of time, wherein the second period of time is subsequent to the first period of time; and responsive to determining that a second subset of the event records, of the second plurality of event records received in the event stream, do not meet the second level of similarity defined by one or more similarity criteria in relation to any of a second plurality of stored representative records: adding a second set of new representative records, that represent the second subset of event records, to the second plurality of stored representative records;

wherein the method is performed by at least one device including a hardware processor.

10. The method of claim 9, further comprising:
obtaining training data sets, a particular training data set of the training data sets comprising:
characteristics of a historical set of event records;
a previous level of similarity used for selecting a particular set of representative records from the historical set of event records; and
a size of the particular set of representative records that was generated based the historical set of event records and the previous level of similarity;
training a machine learning model based on the training data sets to determine a target level of similarity that can be used for generating a target size of a target set of representative records based on characteristics of a target set of event records; and
applying the machine learning model to determine the second level of similarity.

11. The method of claim 10, wherein applying the machine learning model comprises applying the machine learning model to characteristics of the second plurality of event records and a target size for the second plurality of stored representative records.

12. The method of claim 9, determining the first set of real-time characteristics of the event stream comprises using a token bucket algorithm to determine a number of event records received during the first time period.

13. The method of claim 9, further comprising:
determining a second set of real-time characteristics of the event stream based at least on the second plurality of event records received during the second period of time;
based on the second set of real-time characteristics of the event stream, selecting all event records in a third period of time as a third set of representative records; and
storing the third set of representative records.

14. A system comprising:
at least one device including a hardware processor;
the system being configured to perform operations comprising:
receiving a first plurality of event records in an event stream during a first period of time;
responsive to determining that a first subset of the event records, of the first plurality of event records received in the event stream, do not meet a first level of similarity defined by one or more similarity criteria in relation to any of a plurality of stored representative records: adding a first set of new representative records, that represent the first subset of event records, to the plurality of stored representative records;

determining a first set of real-time characteristics of the event stream based at least on the first plurality of event records received during the first period of time;

based on the first set of real-time characteristics of the event stream, selecting a second level of similarity for selection of representative records for future event records to be received in the event stream;

modifying the one or more similarity criteria to define the second level of similarity instead of the first level of similarity, wherein the second level of similarity is different than the first level of similarity;

receiving a second plurality of event records in the event stream during a second period of time, wherein the second period of time is subsequent to the first period of time; and responsive to determining that a second subset of the event records, of the second plurality of event records received in the event stream, do not meet the second level of similarity defined by one or more similarity criteria in relation to any of a second plurality of stored representative records: adding a second set of new representative records, that represent the second subset of event records, to the second plurality of stored representative records.

15. The system of claim 14, wherein the first set of real-time characteristics of the event stream comprise a volume of event records received during the first period of time.

16. The system of claim 14, wherein the second level of similarity based further on one or more of: processing time of the first plurality of event records or resources available for processing the second plurality of event records.

17. The system of claim 14, wherein the operations further comprise computing the second level of similarity based on a polynomial regression function.

18. The system of claim 14, wherein the operations further comprise:
obtaining training data sets, a particular training data set of the training data sets comprising:
characteristics of a historical set of event records;
a previous level of similarity used for selecting a particular set of representative records from the historical set of event records; and
a size of the particular set of representative records that was generated based the historical set of event records and the previous level of similarity;
training a machine learning model based on the training data sets to determine a target level of similarity that can be used for generating a target size of a target set of representative records based on characteristics of a target set of event records; and
applying the machine learning model to determine the second level of similarity.

19. The system of claim 18, wherein applying the machine learning model comprises applying the machine learning model to characteristics of the second plurality of event records and a target size for the second plurality of stored representative records.

20. The system of claim 14, wherein determining the first set of real-time characteristics of the event stream comprises using a token bucket algorithm to determine a number of event records received during the first time period.

* * * * *

UNITED STATES PATENT AND TRADEMARK OFFICE
CERTIFICATE OF CORRECTION

PATENT NO. : 12,204,509 B1  
APPLICATION NO. : 18/438036  
DATED : January 21, 2025  
INVENTOR(S) : Lashgari et al.

Page 1 of 1

It is certified that error appears in the above-identified patent and that said Letters Patent is hereby corrected as shown below:

In the Specification

In Column 13, Line 6, delete "VNICS" and insert -- VNICs --, therefor.

In Column 15, Line 33, delete "(QOS)" and insert -- (QoS) --, therefor.

Signed and Sealed this
Eighth Day of April, 2025

Coke Morgan Stewart
*Acting Director of the United States Patent and Trademark Office*